(12) United States Patent
Ozzie et al.

(10) Patent No.: US 7,581,172 B2
(45) Date of Patent: Aug. 25, 2009

(54) METHOD AND APPARATUS FOR EFFICIENT MANAGEMENT OF XML DOCUMENTS

(75) Inventors: Raymond E. Ozzie, Manchester, MA (US); Kenneth G. Moore, Westford, MA (US); Ransom Richardson, Beverly, MA (US); Edward J. Fischer, Cambridge, MA (US)

(73) Assignee: Groove Networks, Inc., Beverly, MA (US)

( * ) Notice: Subject to any disclaimer, the term of this patent is extended or adjusted under 35 U.S.C. 154(b) by 347 days.

(21) Appl. No.: 11/091,306

(22) Filed: Mar. 28, 2005

(65) Prior Publication Data

US 2005/0171970 A1 Aug. 4, 2005

Related U.S. Application Data

(62) Division of application No. 09/588,195, filed on Jun. 6, 2000, now Pat. No. 6,941,510.

(51) Int. Cl.
*G06F 17/00* (2006.01)
*G06F 12/00* (2006.01)
*G06F 15/16* (2006.01)

(52) U.S. Cl. .................. 715/234; 715/255; 715/760; 711/117; 711/147; 709/203; 709/213

(58) Field of Classification Search .......... 715/200–202, 715/204, 205, 209, 210, 227, 234, 237, 247, 715/253, 254–256, 273, 512, 501.1, 513, 715/713, 744, 760, 762, 854; 707/100, 101, 707/102, 103 R, 103 Y; 709/201–203, 213–217; 711/100, 113, 117, 122, 130, 131, 147, 148, 711/153; 717/100, 103, 106, 108, 111, 114, 717/164, 165, 167
See application file for complete search history.

(56) References Cited

U.S. PATENT DOCUMENTS 6,012,098 A 1/2000 Bayleh et al.
6,049,853 A * 4/2000 Kingsbury et al. .......... 709/213

(Continued)

FOREIGN PATENT DOCUMENTS

EP 0 987 636 A2 3/2000

OTHER PUBLICATIONS

IBM technical Disclosure Bulletin "Technique to Generate very Efficient Compression/Decompression Engines for XML Data Streams Based on the Stream's DTD", UK, Feb. 2000, pp.1-2.*

(Continued)

*Primary Examiner*—Laurie Ries
*Assistant Examiner*—MaiKhanh Nguyen
(74) *Attorney, Agent, or Firm*—Wolf, Greenfield & Sacks, P.C.

(57) ABSTRACT

A storage manager represents XML-compliant documents as a collection of objects, each associated with an element of the XML document. The objects are created with a hierarchy that conforms to the hierarchy of elements in the XML document. Access to the document is then through methods of the objects exposed to application programs through a programming interface. The methods provide a consistent interface to documents regardless of how the data associated with the documents is stored in memory. Consequently, the underlying content of XML documents can be stored using a distributed virtual object system that provides a mechanism for multiple processes to access each object. As an example of the benefits of such a storage manager, the storage manager may be used to maintain a telespace, such as may store information shared by multiple users participating in a collaboration session.

25 Claims, 14 Drawing Sheets

U.S. PATENT DOCUMENTS

| | | | |
|---|---|---|---|
| 6,061,697 A | | 5/2000 | Nakao |
| 6,122,659 A * | | 9/2000 | Olnowich .................... 709/213 |
| 6,219,672 B1 * | | 4/2001 | Hirayama et al. ........... 707/102 |
| 6,446,113 B1 * | | 9/2002 | Ozzie et al. ................. 709/204 |
| 6,490,591 B1 * | | 12/2002 | Denbar et al. ............... 707/101 |
| 6,505,205 B1 * | | 1/2003 | Kothuri et al. .............. 707/100 |
| 6,590,589 B1 * | | 7/2003 | Sluiman et al. ............. 715/751 |
| 6,640,241 B1 * | | 10/2003 | Ozzie et al. ................. 709/204 |
| 6,718,516 B1 * | | 4/2004 | Claussen et al. ............ 707/101 |
| 6,810,414 B1 * | | 10/2004 | Brittain ...................... 709/219 |
| 6,854,120 B1 * | | 2/2005 | Lo et al. ..................... 719/311 |
| 6,883,137 B1 * | | 4/2005 | Girardot et al. ............. 715/513 |
| 6,957,439 B1 * | | 10/2005 | Lewallen .................... 719/328 |
| 7,072,896 B2 * | | 7/2006 | Lee et al. ................. 707/104.1 |
| 7,134,072 B1 * | | 11/2006 | Lovett et al. ................ 715/513 |
| 2002/0169788 A1 * | | 11/2002 | Lee et al. ................. 707/104.1 |

OTHER PUBLICATIONS

Hartmut Liefke, "An Efficient Compressor for XML," AT& T Research Labs, Aug. 1999, pp. 1-38.*

L Wood, "Programming the Web: the W3C DOM specification," vol. 3, No. 1, Jan.-Feb. 1999, pp. 48-54.*

Veldema et al., "Source-Leve Global Optimizations for Fine-Grain Distributed Shared Memory Systems," Proceedings of the eighth ACM SIGPLAN symposium on Principles and practices of parallel programming, 2001, pp. 83-92.*

Rauber et al., "A Hierarchical Computation Model for Distributed Shared-Memory Machines," Parallel and Distributed Processing, 2001. Proceedings. Ninth Euromicro Workshop, Feb. 2001, pp. 57-64.*

Karamcheti et al., "View Caching: Efficient Software Shared Memory for Dynamic Computations," Parallel Processing Symposium, 1997. Proceedings., 11th International, April 1997, pp. 483-489.*

Tseng, Frank S.C., et al, "An Automatic Navigation Scheme for XML Documents Through Object-Relational Repository", Proceedings 2000, Fourth International Conference on Brighton, UK, 830-9/1/00, pp. 428-431.

Arnold-Moore, Tim, et al., "Architecture of a Content Management Server for XML Document Applications", Web Informations Systems, Engineering, 2000, Proceedings of the First Internationational Conference on Hong Kong, China, Jun. 19-21, 2000, Los Alamitos, CA, pp. 97-108.

Ball, Steve, "XML Support for TCL", Proceedings of the Annual TCL/TK Conference. Proceedings of Usenix Annual TCL/TK, 1998, pp. 109-119.

* cited by examiner

1500 — IGrooveCollectionManager

1502 — IGrooveCollection

1504 — IGrooveCollectionListener

1506 — IGrooveCollectionCursor

*FIG. 15*

METHOD AND APPARATUS FOR EFFICIENT MANAGEMENT OF XML DOCUMENTS

RELATED APPLICATIONS

This application is a division of U.S. Ser. No. 09/588,195 filed Jun. 6, 2000, now U.S. Pat. No. 6,941,510, entitled Method and Apparatus for Efficient Management of XML Documents issued on Sep. 6, 2005 by Raymond E. Ozzie, Kenneth G. Moore, Ransom L. Richardson and Edward J. Fischer.

FIELD OF THE INVENTION

This invention relates to storage and retrieval of information and, in particular, to storage and retrieval of information encoded in Extended Markup Language (XML).

BACKGROUND OF THE INVENTION

Modern computing systems are capable of storing, retrieving and managing large amounts of data. However, while computers are fast and efficient at handling numeric data they are less efficient at manipulating text data and are especially poor at interpreting human-readable text data. Generally, present day computers are unable to understand subtle context information that is necessary to understand and recognize pieces of information that comprise a human-readable text document. Consequently, although they can detect predefined text orderings or pieces, such as words in an undifferentiated text document, they cannot easily locate a particular piece of information where the word or words defining the information have specific meanings. For example, human readers have no difficulty in differentiating the word "will" in the sentence "The attorney will read the text of Mark's will.", but a computer may have great difficulty in distinguishing the two uses and locating only the second such use.

Therefore, schemes have been developed in order to assist a computer in interpreting text documents by appropriately coding the document. Many of these schemes identify selected portions of a text document by adding into the document information, called "markup tags", which differentiates different document parts in such a way that a computer can reliably recognize the information. Such schemes are generally called "markup" languages.

One of these languages is called SGML (Standard Generalized Markup Language) and is an internationally agreed upon standard for information representation. This language standard grew out of development work on generic coding and mark-up languages, which was carried out in the early 1970s. Various lines of research merged into a subcommittee of the International Standards Organization called the subcommittee on Text Description and Processing Languages. This subcommittee produced the SGML standard in 1986.

SGML itself is not a mark-up language in that it does not define mark-up tags nor does it provide a markup template for a particular type of document. Instead, SGML denotes a way of describing and developing generalized descriptive markup schemes. These schemes are generalized because the markup is not oriented towards a specific application and descriptive because the markup describes what the text represents, instead of how it should be displayed. SGML is very flexible in that markup schemes written in conformance with the standard allow users to define their own formats for documents, and to handle large and complex documents, and to manage large information repositories.

Recently, another development has changed the general situation. The extraordinary growth of the Internet, and particularly, the World Wide Web, has been driven by the ability it gives authors, or content providers, to easily and cheaply distribute electronic documents to an international audience. SGML contains many optional features that are not needed for Web-based applications and has proven to have a cost/benefit ratio unattractive to current vendors of Web browsers. Consequently, it is not generally used. Instead, most documents on the Web are stored and transmitted in a markup language called the Hypertext Markup Language or HTML.

HTML is a simple markup language based on SGML and it is well suited for hypertext, multimedia, and the display of small and reasonably simple documents that are commonly transmitted on the Web. It uses a small, fixed set of markup tags to describe document portions. The small number of fixed tags simplifies document construction and makes it much easier to build applications. However, since the tags are fixed, HTML is not extensible and has very limited structure and validation capabilities. As electronic Web documents have become larger and more complex, it has become increasingly clear that HTML does not have the capabilities needed for large-scale commercial publishing.

In order to address the requirements of such large-scale commercial publishing and to enable the newly emerging technology of distributed document processing, an industry group called the World Wide Web Consortium has developed another markup language called the Extensible Markup Language (XML) for applications that require capabilities beyond those provided by HTML. Like HTML, XML is a simplified subset of SGML specially designed for Web applications and is easier to learn, use, and implement than full SGML. Unlike HTML, XML retains SGML advantages of extensibility, structure, and validation, but XML restricts the use of SGML constructs to ensure that defaults are available when access to certain components of the document is not currently possible over the Internet. XML also defines how Internet Uniform Resource Locators can be used to identify component parts of XML documents.

An XML document is composed of a series of entities or objects. Each entity can contain one or more logical elements and each element can have certain attributes or properties that describe the way in which it is to be processed. XML provides a formal syntax for describing the relationships between the entities, elements and attributes that make up an XML document. This syntax tells the computer how to recognize the component parts of each document.

XML uses paired markup tags to identify document components. In particular, the start and end of each logical element is clearly identified by entry of a start-tag before the element and an end-tag after the element. For example, the tags <to> and </to> could be used to identify the "recipient" element of a document in the following manner:

document text . . . <to>Recipient</to> . . . document text.

The form and composition of markup tags can be defined by users, but are often defined by a trade association or similar body in order to provide interoperability between users. In order to operate with a predefined set of tags, users need to know how the markup tags are delimited from normal text and the relationship between the various elements. For example, in XML systems, elements and their attributes are entered between matched pairs of angle brackets (< . . . >), while entity references start with an ampersand and end with a semicolon (& . . . ;). Because XML tag sets are based on the logical structure of the document, they are easy to read and understand.

Since different documents have different parts or components, it is not practical to predefine tags for all elements of all documents. Instead, documents can be classified into "types" which have certain elements. A document type definition (DTD) indicates which elements to expect in a document type and indicates whether each element found in the document is not allowed, allowed and required or allowed, but not required. By defining the role of each document element in a DTD, it is possible to check that each element occurs in a valid place within the document. For example, an XML DTD allows a check to be made that a third-level heading is not entered without the existence of a second-level heading. Such a hierarchical check cannot be made with HTML. The DTD for a document is typically inserted into the document header and each element is marked with an identifier such as <!ELEMENT>.

However, unlike SGML, XML does not require the presence of a DTD. If no DTD is available for a document, either because all or part of the DTD is not accessible over the Internet or because the document author failed to create the DTD, an XML system can assign a default definition for undeclared elements in the document.

XML provides a coding scheme that is flexible enough to describe nearly any logical text structure, such as letters, reports, memos, databases or dictionaries. However, XML does not specify how an XML-compliant data structure is to be stored and displayed, much less efficiently stored and displayed. Consequently, there is a need for a storage mechanism that can efficiently manipulate and store XML-compliant documents.

SUMMARY OF THE INVENTION

In accordance with one embodiment of the invention, an in-memory storage manager represents XML-compliant documents as a collection of objects in memory. The collection of objects allows the storage manager to manipulate the document, or parts of the document with a consistent interface and to provide for features that are not available in conventional XML documents, such as element attributes with types other than text and documents that contain binary, rather than text, information. In addition, in the storage manager, the XML-compliant document is associated with a schema document (which is also an XML document) that defines the arrangement of the document elements and attributes. The storage manager can operate with conventional storage services to persist the XML-compliant document. Storage containers contain pieces of the document that can be quickly located by the storage manager.

In accordance with another embodiment, the storage manager also has predefined methods that allow it to access and manipulate elements and attributes of the document content in a consistent manner. For example, the schema data can be accessed and manipulated with the same methods used to access and manipulate the document content.

In accordance with yet another embodiment, the schema data associated with a document can contain a mapping between document elements and program code to be associated with each element. The storage manager further has methods for retrieving the code from the element tag. The retrieved code can then be invoked using attributes and content from the associated element and the element then acts like a conventional object.

In all embodiments, the storage manager provides dynamic, real-time data access to clients by multiple processes in multiple contexts. Synchronization among multiple processes accessing the same document is coordinated with event-driven queues and locks. The objects that are used to represent the document are constructed from common code found locally in each process. In addition, the data in the objects is also stored in memory local to each process. The local memories are synchronized by means of a distributed memory system that continually equates the data copies of the same element in different processes.

In still another embodiment, client-specified collections are managed by a separate collection manager. The collection manager maintains a data structure called a "waffle" that represents the XML data structures in tabular form. A record set engine that is driven by user commands propagates a set of updates for a collection to the collection manager. Based on those updates, the collection manager updates index structures and may notify waffle users via the notification system. The waffle user may also navigate within the collection using cursors.

BRIEF DESCRIPTION OF THE DRAWINGS

The above and further advantages of the invention may be better understood by referring to the following description in conjunction with the accompanying drawings in which:

FIG. 15 is an illustration of the collection manager interfaces constructed in accordance with an object-oriented implementation of the invention.

DETAILED DESCRIPTION

Figure 1:
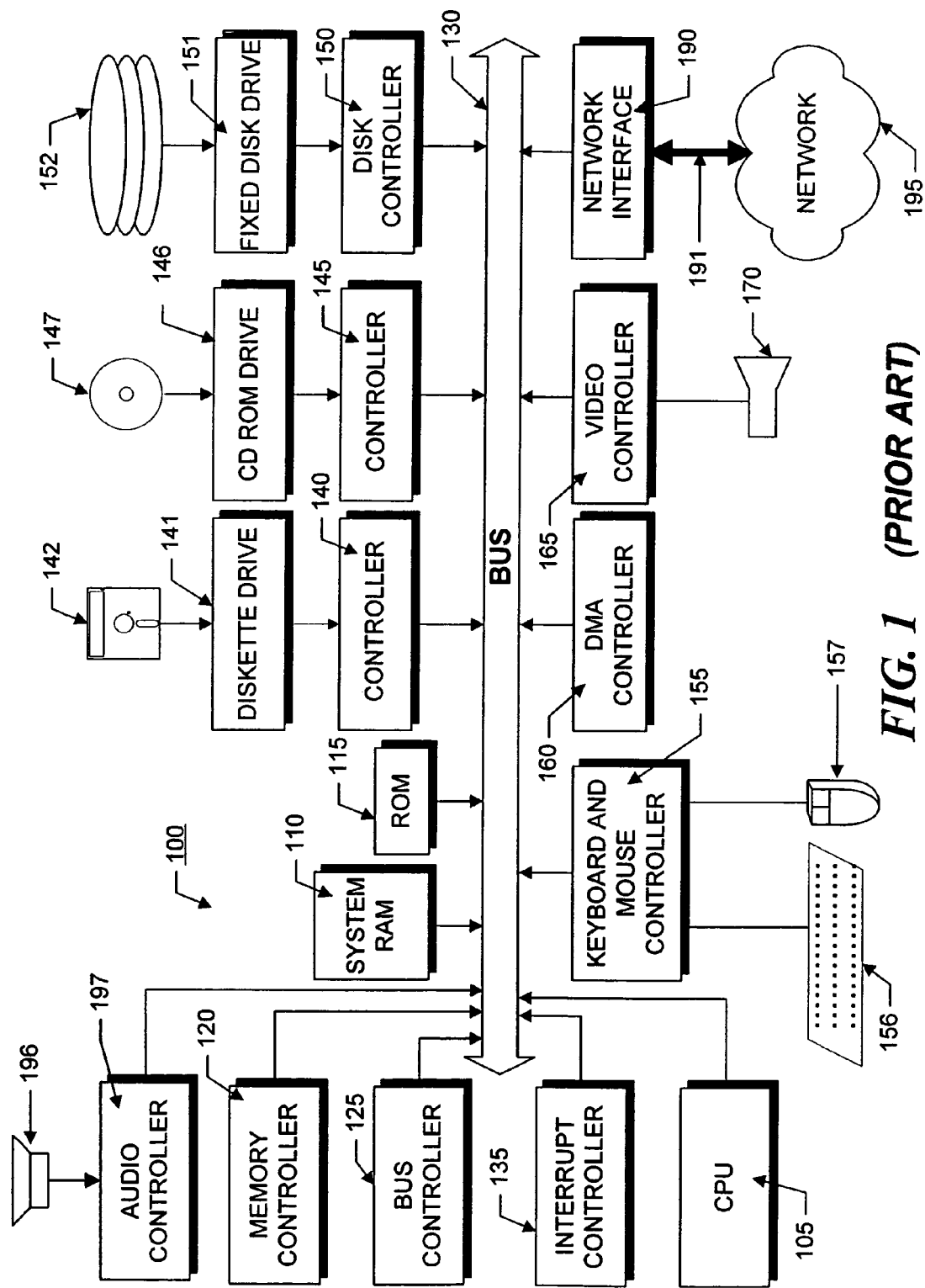
FIG. 1 is a schematic diagram of a computer system on which the inventive storage manager system can run.

FIG. 1 illustrates the system architecture for an exemplary client computer 100, such as an IBM THINKPAD 600®, on which the disclosed document management system can be implemented. The exemplary computer system of FIG. 1 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 1 and also to devices with computers in them, such as game consoles or cable TV set-top boxes, which may not traditionally be thought of as computers.

The client computer 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with client computer 100 via removable media, such as diskette 142 and CD-ROM 147. Diskette 142 is insertable into diskette drive 141, which is connected to bus 130 by controller 140. Similarly, CD-ROM 147 can be inserted into CD-ROM drive 146, which is connected to bus 130 by controller 145. Finally, the hard disk 152 is part of a fixed disk drive 151, which is connected to bus 130 by controller 150.

User input to the client computer 100 may be provided by a number of devices. For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to client computer 100 through bus 130 and an appropriate controller. DMA controller 160 is provided for performing direct memory access to system RAM 110. A visual display is generated by a video controller 165, which controls video display 170.

Client computer 100 also includes a network adapter 190 that allows the client computer 100 to be interconnected to a network 195 via a bus 191. The network 195, which may be a local area network (LAN), a wide area network (WAN), or the Internet, may utilize general-purpose communication lines that interconnect multiple network devices.

Client computer system 100 generally is controlled and coordinated by operating system software, such as the WINDOWS NT™ operating system (available from Microsoft Corp., Redmond, Wash.). Among other computer system control functions, the operating system controls allocation of system resources and performs tasks such as process scheduling, memory management, networking and I/O services.

Figure 2:
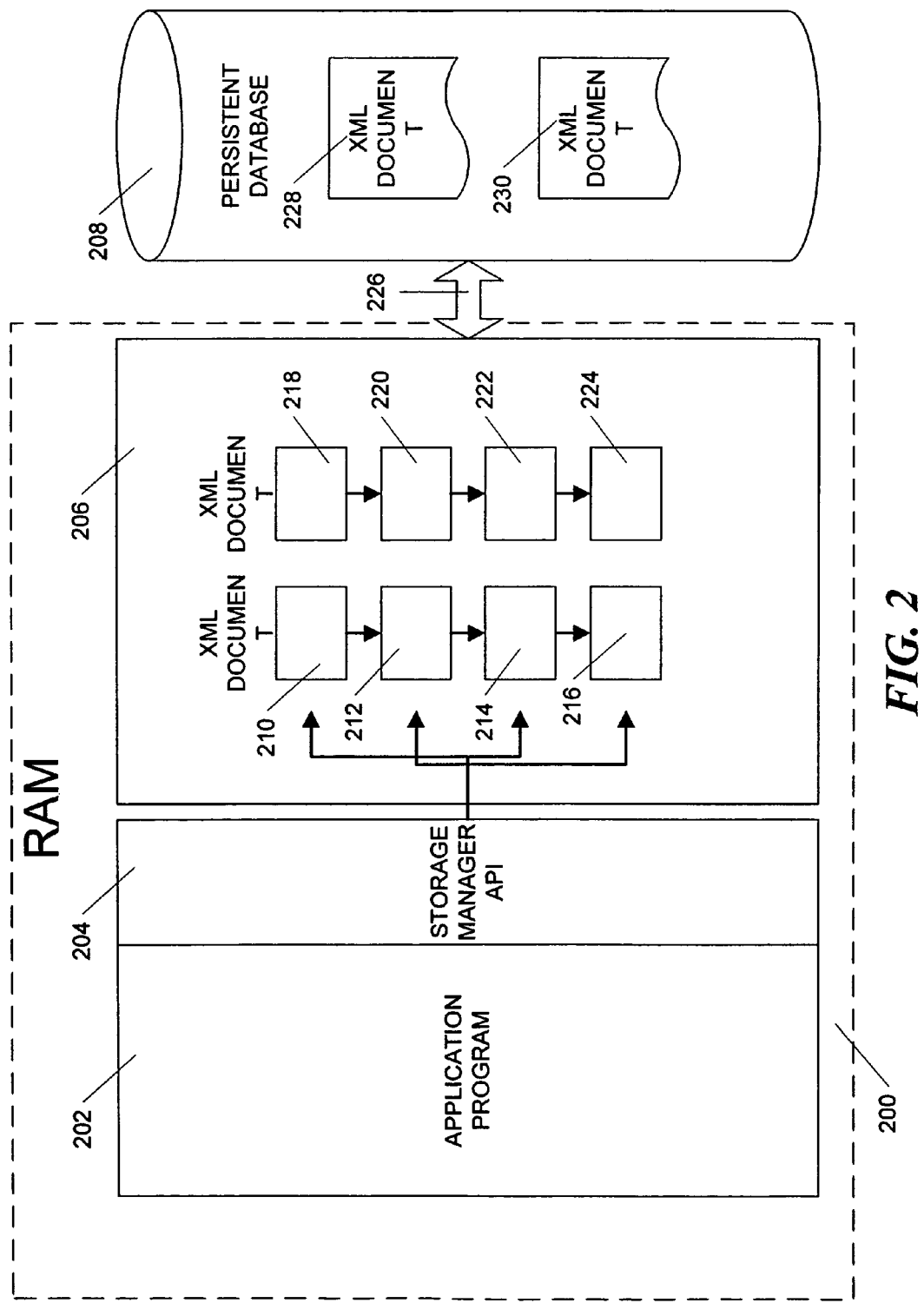
FIG. 2 is a block schematic diagram illustrating the relationship of the in-memory storage manager and persistent storage.

As illustrated in more detail in FIG. 2, the storage manager 206 resides in RAM 200 (equivalent to RAM 110 in FIG. 1) and provides an interface between an application program 202 which uses XML documents 228 and 230 and the persistent storage 208 in which the documents 228 and 230 are stored. The application 202 can interact with storage manager 206 by means of a consistent application programming interface 204 irregardless of the type of persistent storage 208 used to store the objects. Internally, the storage manager 206 represents each document 210, 218, as a hierarchical series of objects 212-216 and 220-224, respectively. The storage manager 206 can store the documents 210 and 218 in persistent storage 208 as schematically illustrated by arrow 226 using a variety of file systems, such as directory-based file services, object stores and relational file systems.

The inventive system operates with conventional XML files. A complete XML file normally consists of three components that are defined by specific markup tags. The first two components are optional, the last component is required, and the components are defined as follows:

1. An XML processing statement which identifies the version of XML being used, the way in which it is encoded, and whether it references other files or not. Such a statement takes the form:

<?xml version="1.0" encoding="UTF-8" standalone="yes"?>

2. A document type definition (DTD) that defines the elements present in the file and their relationship. The DTD either contains formal markup tag declarations describing the type and content of the markup tags in the file in an internal subset (between square brackets) or references a file containing the relevant markup declarations (an external subset). This declaration has the form:

<!DOCTYPE Appl SYSTEM "app.dat">

3. A tagged document instance which consists of a root element, whose element type name must match the document type name in the document type declaration. All other markup elements are nested in the root element.

If all three components are present, and the document instance conforms to the document model defined in the DTD, the document is said to be "valid." If only the last component is present, and no formal document model is present, but each element is properly nested within its parent elements, and each attribute is specified as an attribute name followed by a value indicator (=) and a quoted string, document instance is said to be "well-formed." The inventive system can work with and generate well-formed XML documents.

Within the storage manager 206, XML documents are represented by means of data storage partitions which are collectively referred to by the name "Groove Document" to distinguish the representation from conventional XML documents. Each Groove document can be described by a DTD that formally identifies the relationships between the various elements that form the document. These DTDs follow the standard XML format. In addition, each Groove document has a definition, or schema, that describes the pattern of elements and attributes in the body of the document. XML version 1.0 does not support schemas. Therefore, in order to associate a Groove schema document with an XML data document, a special XML processing instruction containing a URI reference to the schema is inserted in the data document. This processing instruction has the form:

<?schema URI="groovedocument:///GrooveXSS/$PersistRoot/sample.xml"?>

Some elements do not have, or require, content and act as placeholders that indicate where a certain process is to take place. A special form of tag is used in XML to indicate empty elements that do not have any contents, and therefore, have no end-tag. For example, a <ThumbnailBox> element is typically an empty element that acts as a placeholder for an image embedded in a line of text and would have the following declaration within a DTD:

```
<!ELEMENT ThumbnailBox EMPTY>
```
Where elements can have variable forms, or need to be linked together, they can be given suitable attributes to specify the properties to be applied to them. These attributes are specified in a list. For example, it might be decided that the <ThumbnailBox> element could include a Location and Size attributes. A suitable attribute list declaration for such an attribute would be as follows:

```
<!ATTLIST ThumbnailBox
    Location  ENTITY  #REQUIRED
    Size      CDATA   #IMPLIED
>
```

This tells the computer that the <ThumbnailBox> element includes a required Location entity and may include a Size attribute. The keyword #IMPLIED indicates that it is permissible to omit the attribute in some instances of the <ThumbnailBox> element.

XML also permits custom definition statements similar to the #DEFINE statements used with some compilers. Commonly used definitions can be declared within the DTD as "entities." A typical entity definition could take the form:

```
<!ENTITY BinDoc3487 SYSTEM "./3487.gif" NDATA>
``` which defines a file location for the binary document "BinDoc3487." Once such a declaration has been made in the DTD, users can use a reference in place of the full value. For example, the <ThumbnailBox> element described previously could be specified as <ThumbnailBox Location=BinDoc3487 Size="Autosize"/>. An advantage of using this technique is that, should the defined value change at a later time, only the entity declaration in the DTD will need to be updated as the entity reference will automatically use the contents of the current declaration.

Within the storage manager, each document part is identified by a Uniform Resource Identifier (URI) which conforms to a standard format such as specified in RFC 2396. URIs can be absolute or relative, but relative URIs must be used only within the context of a base, absolute URI. When the document is stored in persistent storage, its parts may be identified by a different STORAGEURI that is assigned and managed by the particular file system in use.

Figure 3:
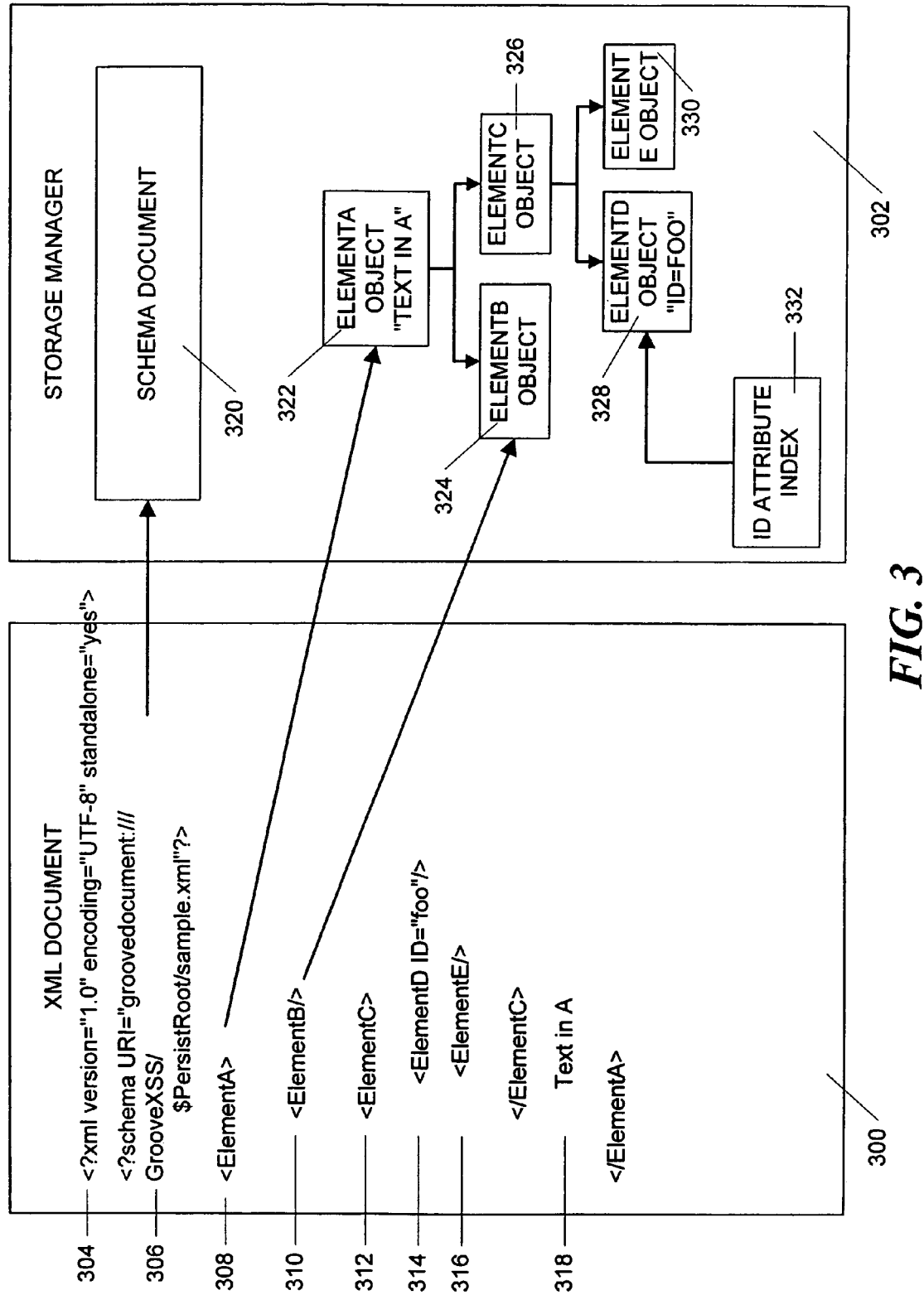
FIG. 3 is a block schematic diagram illustrating the representation of an XML document on the storage manager memory as a collection of objects.

In accordance with the principles of the invention, within each document part, in the storage manager internal memory is represented by a collection of objects. For example, separate elements in the XML document are represented as element objects in the storage manager. This results in a structure that is illustrated in FIG. 3. In FIG. 3, an illustrative XML document 300 is represented as a collection of objects in storage manager 302. In particular, the XML document 300 contains the conventional XML processing statement 304 which identifies the XML version, encoding and file references as discussed above. Document 300 also contains an XML processing statement 306 which identifies a schema document 320 in storage manager 302 which is associated with the document 300. The illustrative XML document also contains a set of hierarchical elements, including ElementA 308 which contains some text 318, ElementA contains ElementB 310 which has no text associated with it. ElementB also contains ElementC 312, which, in turn, contains two elements. Specifically, ElementC contains ElementD 314 that has an attribute (ID, with a value "foo") and ElementE 316.

In the storage manager 302, the elements, ElementA-ElementE, are represented as element objects arranged in a hierarchy. In particular, ElementA is represented by ElementA object 322. Each element object contains the text and attributes included in the corresponding XML element. Therefore, element object 322 contains the text 318. Similarly, ElementB 310 is represented by element object 324 and elements ElementC, ElementD and ElementE are represented by objects 326, 328 and 330, respectively. Element object 328, which represents element ElementD, also includes the attribute ID that is included in the corresponding element. Each element object references its child element objects by means of database pointers (indicated by arrows between the objects) into order to arrange the element objects into a hierarchy. There may also be attribute indices, such as index 332 that indexes the ID attribute in element object 328.

The representation of the XML document 300 by means of an object collection allows the storage manager 302 to manipulate its internal representation of the document 300 with a consistent interface that is discussed in detail below. The storage manager 302 can also provide features that are not available in conventional XML documents, such as collection services that are available via a collection manager that is also discussed in detail below.

As described above, Groove documents that contain XML data may have a definition, or schema document, that describes the pattern of elements and attributes in the body of the document. The schema document is stored in a distinct XML document identified by a URI. The schema document has a standard XML DTD definition, called the meta-schema, which is shown below:

```
<!-- The Document element is the root element in the schema -->
<!ELEMENT Document (Registry*, AttrGroup*, ElementDecl*)>
<!ATTLIST Document
    URL    CDATA   #REQUIRED
>
<!ELEMENT Registry TagToProgID*>
<!ELEMENT TagToProgID EMPTY>
<!ATTLIST TagToProgID
    Tag     CDATA   #REQUIRED
    ProgID  CDATA   #REQUIRED
>
<!ELEMENT AttrGroup AttrDef*>
<!ELEMENT AttrDef EMPTY>
<!ATTLIST AttrDef
    Name         CDATA   #REQUIRED
    Type         CDATA   #REQUIRED
    Index        CDATA   #IMPLIED
    DefaultValue CDATA   #IMPLIED
>
<!ELEMENT ElementDecl (ElementDecl* | AttrGroup | ElementRef*)>
<!ATTLIST ElementDecl
    Name    CDATA   #REQUIRED
>
<!ELEMENT ElementRef EMPTY>
<!ATTLIST ElementRef
    Ref     CDATA   #REQUIRED
>
```

Each of the elements in the schema defines information used by the storage manager while processing the document. The "Registry" section forms an XML representation of a two-column table that maps XML element tags to Windows ProgIDs. (In the Common Object Model (COM) developed by Microsoft Corporation, a ProgID is a text name for an object that, in the COM system, is "bound" to, or associated with, a section of program code. The mapping between a given ProgID and the program code, which is stored in a library, is specified in a definition area such as the Windows™ registry.)

Figure 4A:
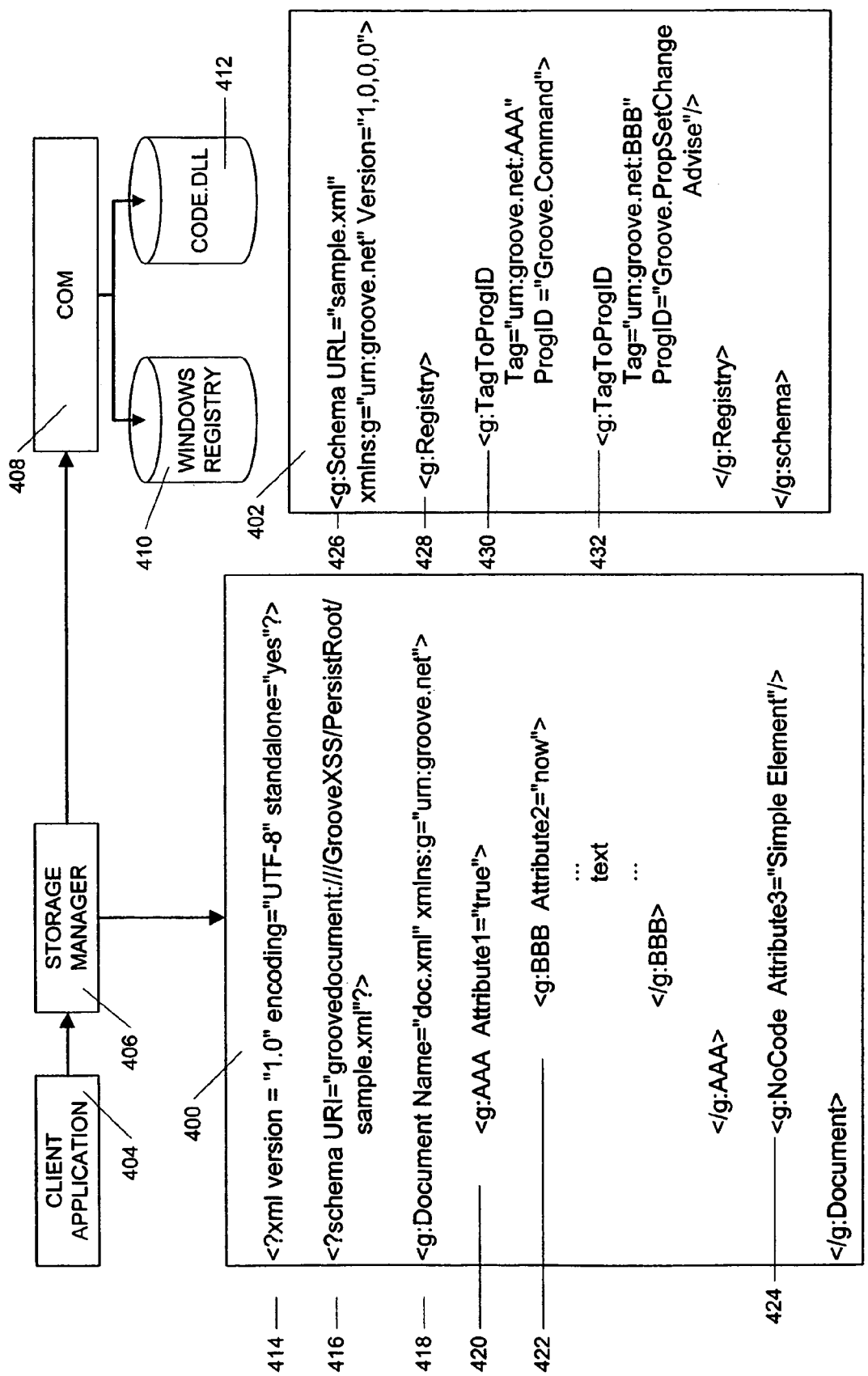
FIG. 4A is a block schematic diagram illustrating the components involved in binding code to XML elements.

This arrangement is shown in FIG. 4A that illustrates an XML document 400 and its related schema document 402.

Both of these documents are resident in the storage manager 406 and would actually be represented by objects as shown in FIG. 3. However, in FIG. 4, the documents have been represented in conventional XML format for clarity. FIG. 4 shows the storage manager operational in a Windows™ environment that uses objects constructed in accordance with the Common Object Model (COM) developed by the Microsoft Corporation, Redmond, Wash., however, the same principles apply in other operating system environments.

XML document 400 includes the normal XML processing statement 414 that identifies the XML version, encoding and file references. A schema XML processing statement 416 references the schema document 402 which schema document is associated with document 400 and has the name "urn:groove.net:sample.xml" defined by name statement 426. It also includes a root element 418 which defines a name "doc.xml" and the "g" XML namespace which is defined as "urn:groove.net"

Document 400 has three other elements, including element 420 defined by tag "urn:groove.net:AAA", element 422 defined by tag "urn:groove.net:BBB" and element 424 defined by tag "urn:groove.net:NoCode". Element 424 is a simple element that has no corresponding bound code and no corresponding tag-to-ProgID mapping in the schema document 402.

Figure 4B:
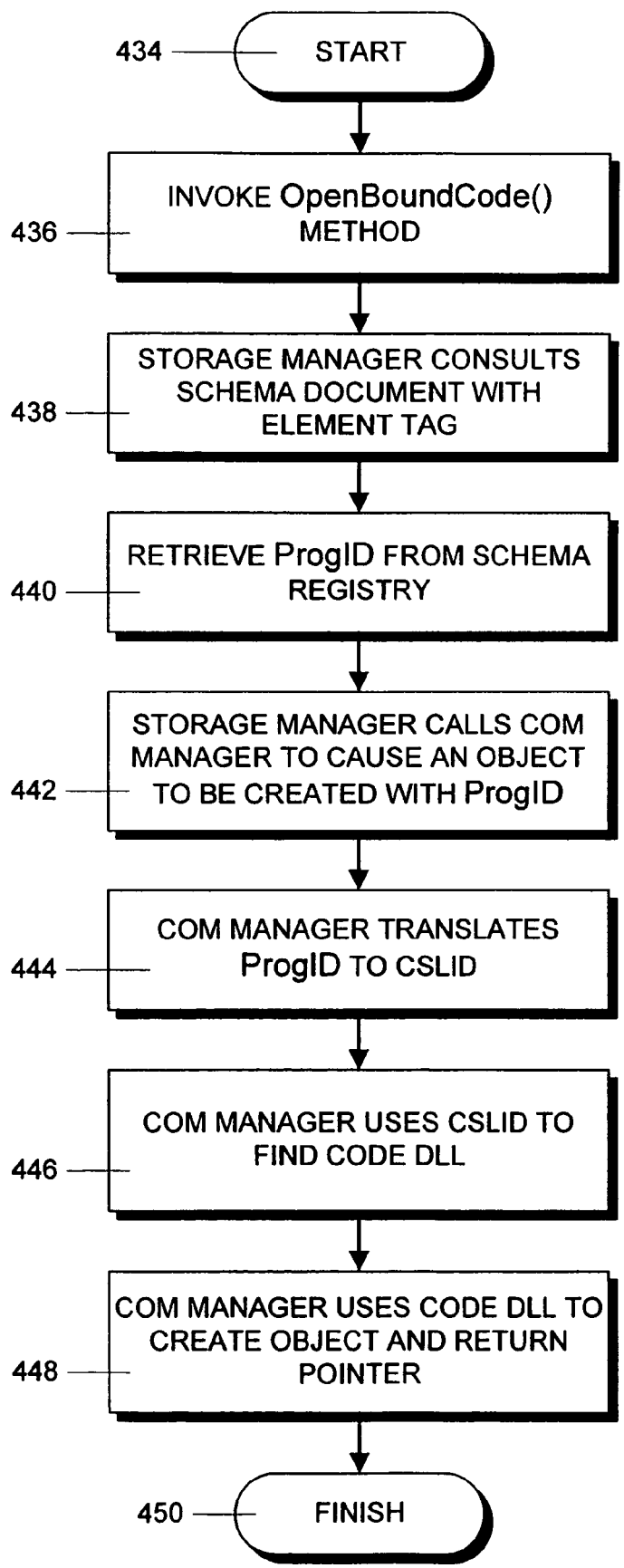
FIG. 4B is a flowchart showing the steps involved in retrieving program code bound to an element.

Within the "registry" section defined by tag 428, the schema document 402 has two element-to-COM ProgID mappings defined. One mapping is defined for elements with the tag "urn:groove.net:AAA" and one for elements with the tag "urn:groove.net:BBB." The bound code is accessed when the client application 404 invokes a method "OpenBoundCode( )." The syntax for this invocation is given in Table 15 below and the steps involved are illustrated in FIG. 4B. Invoking the OpenBoundCode( ) method on a simple element, such as element 424 generates an exception. The process of retrieving the bound code starts in step 434 and proceeds to step 436 in which the OpenBoundCode( ) is invoked. Invoking the OpenBoundCode( ) method on an element with the element tag "urn:groove.net:AAA" causes the storage manager 406 to consult the registry element 428 in the schema document 602 with the element tag as set forth in step 438. From section 430, the storage manager retrieves the ProgID "Groove.Command" as indicated in step 440. In step 442, the storage manager calls the COM manager 408 in instructs it to create an object with this ProgID. In a conventional, well-known manner, in step 444, the COM manager translates the ProgID to a CSLID using a key in the Windows Registry 410. In step 446, the COM manager uses the CSLID to find a dynamically loadable library (DLL) file in the code database 412 that has the code for the object. Finally, in step 448, the COM manager creates the object and returns an interface pointer for the object to the storage manager 406 which, in turn, returns the pointer to the client application 404. The routine then finishes in step 450. The client application 404 can then use the pointer to invoke methods in the code that use attributes and content in the associated element. The element then behaves like any other COM object. A similar process occurs if the OpenBoundCode( ) method is invoked on elements with the tag "urn:groove.net:BBB."

The "AttrGroup" section defines non-XML characteristics for attributes. An attribute's data type can be defined as some type other than text and the attribute may be indexed to facilitate fast retrieval of the elements that containing it.

The "ElementDecl" section provides a form of element definition similar to the DTD <!ELEMENT> declaration, but allows for extended attribute characteristics and the definition of non-containment element references.

The following example shows the sample portions of a schema document for an XML document that defines a "telespace" that is previously described.

```
<groove:Document URL="TelespaceSchema.xml"
        xmlns:groove="urn:groove.net:schema.1">
    <groove:Registry>
        <groove:TagToProgID groove:Tag="g:Command"
            groove:ProgID="Groove.Command"/>
        <groove:TagToProgID groove:Tag="groove:PropertySetChanged"
            groove:ProgID="Groove.PropSetChangeAdvise"/>
    </groove:Registry>
    <groove:AttrGroup>
        <groove:AttrDef Name="ID" Index="true"/>
        <!-- KEY EXCHANGE ATTRIBUTES -->
        <groove:AttrDef Name="NKey" Type="Binary"/>
        <groove:AttrDef Name="ReKeyId" Type="String"/>
        <groove:AttrDef Name="T" Type="String"/>
        <!-- AUTHENTICATION ATTRIBUTES -->
        <groove:AttrDef Name="MAC" Type="Binary"/>
        <groove:AttrDef Name="Sig" Type="Binary"/>
        <!-- ENCRYPTION ATTRIBUTES -->
        <groove:AttrDef Name="IV" Type="Binary"/>
        <groove:AttrDef Name="EC" Type="Binary"/>
        <!-- XML Wrapper Attributes -->
        <groove:AttrDef Name="Rows" Type="Long"/>
        <groove:AttrDef Name="Cols" Type="Long"/>
        <groove:AttrDef Name="Items" Type="Long"/>
        <groove:AttrDef Name="ItemID" Type="Bool" Index="true"/>
    </groove:AttrGroup>
    <groove:ElementDecl Name="groove:Telespace">
        <AttrGroup>
            <AttrDef Name="Persist" DefaultValue="True" Type="Bool"/>
            <AttrDef Name="Access" DefaultValue="Identity"
                Type="String"/>
        </AttrGroup>
        <ElementRef Element="Dynamics"/>
        <ElementRef Element="Members"/>
    </groove:ElementDecl>
</groove:Document>
```

In this example, there are two entries in the Tag to ProgID mapping table. The first maps the tag "g:Command" (which, using XML namespace expansion, is "urn:groove.net.schema.1:Command") to the ProgID "Groove.Command." In the section defining attributes, the "ID" attribute is indexed, the data type of the NKey attribute is binary, and so on.

This schema data is represented by element objects and can be accessed and manipulated by the same storage manager element and attribute interface methods used to manipulate documents as described in detail below. In particular, the information that describes a document can be manipulated using the same interfaces that are used for manipulating the document content.

Figure 5:
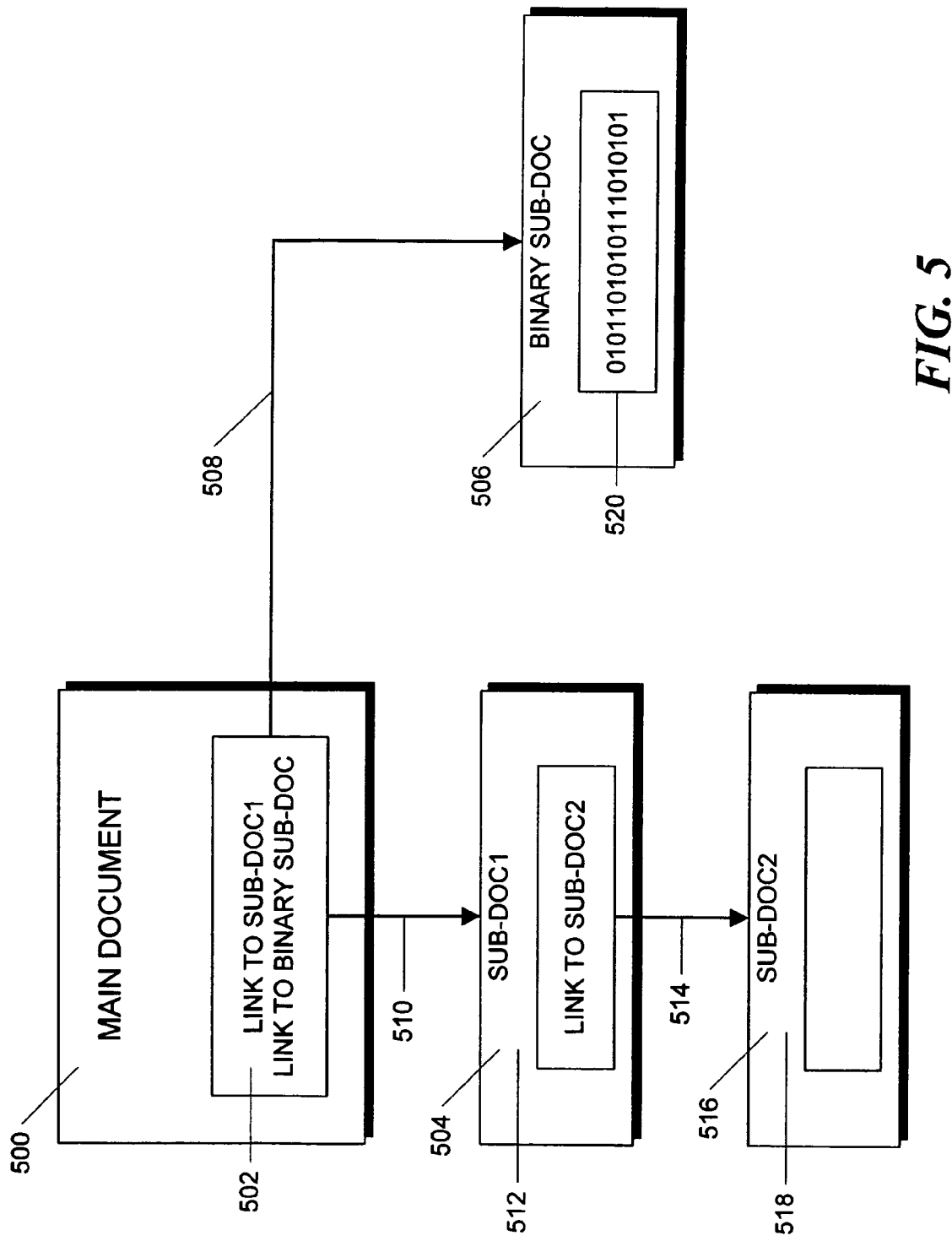
FIG. 5 illustrates the relationship of XML text documents and binary sub-documents.

In accordance with another aspect of the invention, sub-documents can be associated with a primary document. Any document may be a sub-document of a given document. If a document contains a sub-document reference to another document, then the referenced document is a sub-document. If two documents contain sub-document references to each other, then each document is a sub-document of the other document. Each sub-document is referenced from the primary document with conventional XML XLink language, which is described in detail at website www.w3.org/TR/xlink. Links may also establish a relationship between an all-text XML document and a binary sub-document. Binary documents do not have links to any kind of sub-document. If the link is to a document fragment, a subdocument relationship is established with the document that contains the fragment. The relationship of documents and sub-documents is illustrated in FIG. 5.

For example, main document 500 contains links 502 which include a link, represented by arrow 510, to document 504 and a link, represented by arrow 508, to a binary document 506. Documents 504 and 506 are thus sub-documents of document 500. Document 504, in turn, contains links 512 which include a link, represented by arrow 514 to document 516 with content 518. Document 516 is a sub-document of document 500. Document 506 contains binary content 520 and, therefore, cannot have links to sub-documents.

Sub-document links follow the standard definition for simple links. An exemplary element definition of a link is as follows:

```
<!ELEMENT GrooveLink ANY>
<!ATTLIST GrooveLink
    xml:link      CDATA                           #FIXED "simple"
    href          CDATA                           #REQUIRED
    role          CDATA                           #IMPLIED "sub-document"
    title         CDATA                           #IMPLIED
    show          (parsed|replace|new)            #IMPLIED
    actuate       (auto|user)                     #IMPLIED
    serialize     (byvalue|byreference|ignored)   #IMPLIED
    behavior      CDATA                           #IMPLIED
    content-role  CDATA                           #IMPLIED
``` sub-document relationship to the document identified by a URI value in the href attribute.

Given the relationships from a document to its sub-documents, it is possible to make a copy of an arbitrary set of documents and sub-documents. Within a single storage service, it may be possible to directly perform such a copy. To cross storage services or to send multiple documents to another machine, the entire hierarchy of such documents must be "describable" in a serialized fashion. The inventive Storage Manager serializes multiple documents to a text representation conforming to the specification of MIME Encapsulation of Aggregate documents, such as HTML (MHTML) which is described in detail at website ftp.isi.edu/in-notes/rfc2557.txt.

The following data stream fragment is an example of a document and a referenced sub-document as they would appear in an MHTML character stream. In the example, "SP" means one space is present and "CRLF" represents a carriage return-line feed ASCII character pair. All other characters are transmitted literally. The MIME version header has the normal MIME version and the Groove protocol version is in a RFC822 comment. The comment is just the word "Groove" followed by an integer. The boundary separator string is unique, so a system that parsed the MIME, and then each body part, will work correctly. The serialized XML text is illustrated in UTF-8 format, but it could also be transmitted in WBXML format. The XML document has a XML prefix, which includes the version and character encoding. The binary document is encoded in base64.

```
MIME-Version: SP 1.0 SP (Groove SP 2) CRLF
Content-Type: SP multipart/related; SP boundary="<<[[&&&]]>>" CRLF
CRLF
--<<[[&&&]]>>Content-Type: SP text/XML; SP charset="UTF-8"
<?xml version="1.0" encoding='utf-8'?>
<rootelement>
.
.
.
</rootelement> CRLF
CRLF
--<<[[&&&]]>>
Content-ID: SP <URI> CRLF
Content-Type: SP application/octet-stream CRLF
Content-Transfer-Encoding: base64 CRLF
CRLF
R0IGODIhdQAgAPcAAP//////zP//mf//Zv//M///AP/M///MzP/Mmf/MZv/MM//MAP+Z//+Z
zP+Zmf+ZZv+ZM//+ZAP9m//9mzP9mmf9mZv9mM/9mAP8z//8zzP8zmf8zZv8zM/8zAP8A//8A
zP8Amf8AZv8AM/8AAMz//8z/zMz/mcz/Zsz/M8z/AMzM/8zMzMmczMZszMM8zMAMyZ/8yZ
zMyZmcyZZsyZM8yZAMxm/8xmzMxmmcxmZsxmM8xmAMwz/8wzzMwzmcwzZswzM8wzAMwA/8wA
zMwAmcwAZswwAM8wAAJn//5n/zJn/mZn/Zpn/M5n/AJnM/5nMzJnMmZnMZpnMM5nMAJmZ/5mZ
OG/qTMnzJUWQHoMKHUq0KEagRpMqXaoUaU6dG2IKIOqRKtOkTq9q3VrV5sd/XMOKZZp1rNmz
GsuiXct2hNq2cMVmXdkzZ12LLe/ehYrXpsy/MPUGHvw04IzCdhFbzasYMd+aUxsnnrzTq1uw
cTN3tVrxrebPWDGDHr3UM+nTHE2jXn1RNevXEI3Dfi179urDJrte5BzVcknNhyNHZiyzJnGv
uWMuppu7uHLkyV1Kxe1ccOGZ0Cn/xshcu8/K2g2LQ8bJGPJj4eh3+/WNHb118PAtBn8aXTrn
6s7tl2QP9b399fhNN55tbe31FYEITIRbgqAtyCBwAz5I20MUVmjhhRgyFBAAOw==
--<<[[&&&]]>>--
```

-continued

```
    content-title  CDATA           #IMPLIED
    inline         (true|false)    #IMPLIED "true"
>
```

It is also possible to establish a sub-document relationship without using the above definition by adding to a document an XML link which has an xml:link attribute with a value "simple", and a href attribute. Such a link will establish a Unlike most XML processors, such as document editors or Internet browsers, the storage manager provides for concurrent document operations. Documents may be concurrently searched, elements may be concurrently created, deleted, updated, or moved. Copies of element hierarchies may be moved from one document to another. In most XML processors, all of the updates to a document are driven by a single user, who is usually controlling a single thread within a single process on a single computer.

Figure 6:
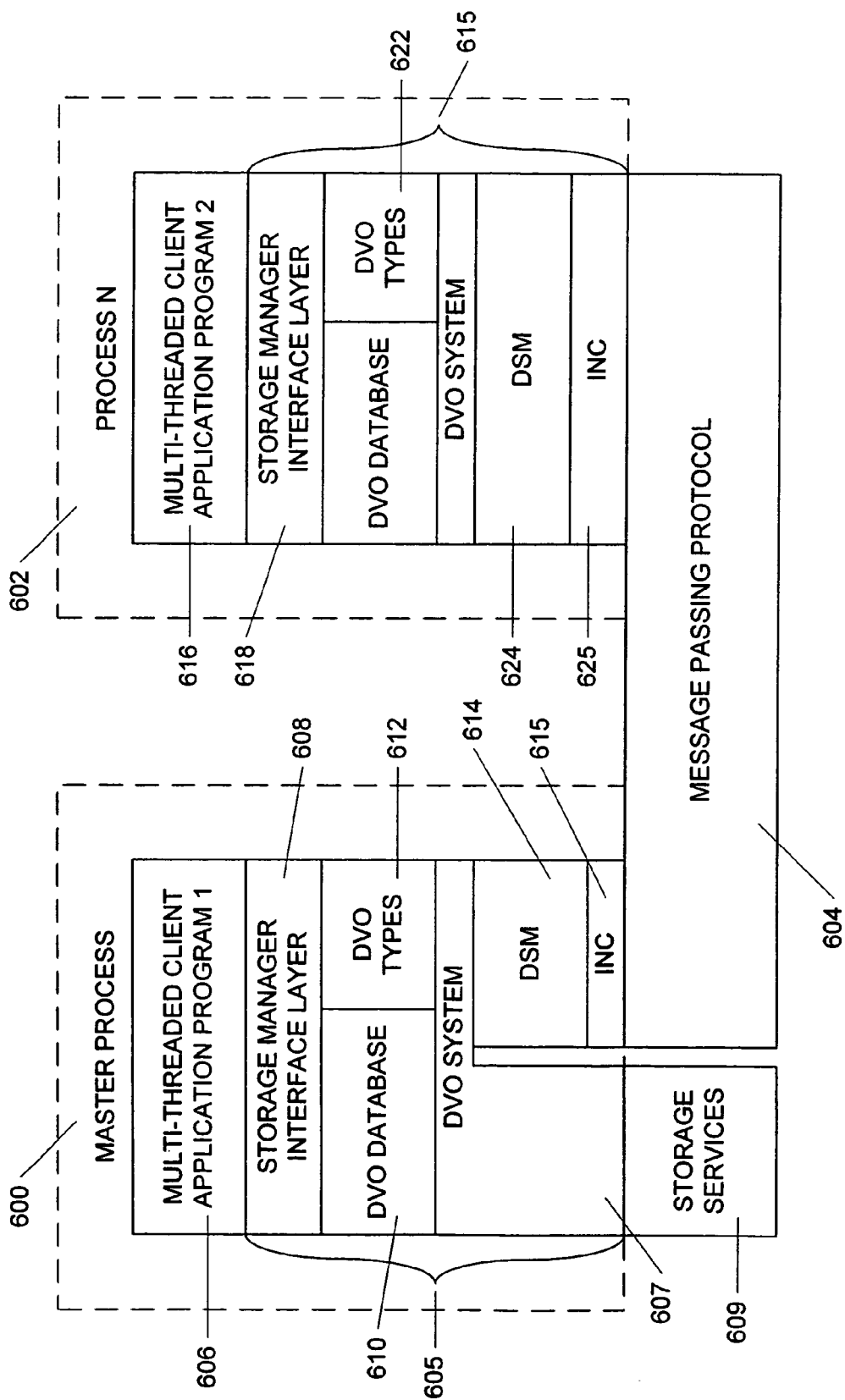
FIG. 6 is a block schematic diagram illustrating the major internal parts of the storage manager in different processes.

The storage manager maintains XML document integrity among many users updating the same document, using multiple threads in multiple processes. In a preferred embodiment, all of the updates occur on a single computer, but, using other different, conventional inter-processor communication mechanisms, other operational embodiments are possible. FIG. 6 shows the basic structure of the storage manager and illustrates how it isolates application programs from cross-process communication issues. For example, two separate processes 600 and 602 may be operating concurrently in the same computer or in different computers. Process 600 is a "home" process as described below, while process 602 is another process designated as Process N. Within process 600, a multi-threaded client application program 606 is operating and within process 602, a multi-threaded client application program 616 is operating.

Each application program 606 and 616 interfaces with a storage manager designated as 605 and 615, respectively. In process 600, the storage manager comprises a storage manager interface layer 608 which is used by application program 608 to control and interface with the storage manager. It comprises the database, document, element and schema objects that are actually manipulated by the application. The API exported by this layer is discussed in detail below. The storage manager 605 also includes distributed virtual object (DVO) database methods 610, DVO methods for fundamental data types 612, DVO common system methods 609 and distributed shared memory 614. Similarly, the storage manager operating in process 602 includes transaction layer 618, DVO database methods 620, DVO methods for fundamental data types 622, DVO common system methods 617 and distributed shared memory 624.

The two processes 600 and 602 communicate via a conventional message passing protocol or inter-process communication (IPC) system 604. For processes that run in a single computer, such a system can be implemented in the Windows® operating system by means of shared memory buffers. If the processes are running in separate computers, another message passing protocol, such as TCP/IP, can be used. Other conventional messaging or communications systems can also be used without modifying the operation of the invention.

However, as is shown in FIG. 6, application programs 606 and 616 do not directly interact with the message passing system 604. Instead, the application programs 606 and 616 interact with storage managers 605 and 615, respectively, and storage managers 605 and 615 interact with the message passing system 604 via a distributed shared memory (DSM) system of which DSM systems 614 and 624 are a part.

A number of well-known DSM systems exist and are suitable for use with the invention. In accordance with a preferred embodiment, the DSM system used with the storage manager is called a C Region Library (CRL) system. The CRL system is an all-software distributed shared memory system intended for use on message-passing multi-computers and distributed systems. A CRL system and code for implementing such as system is described in detail in an article entitled "CRL: High-Performance All-Software Distributed Memory System", K. L. Johnson, M. F. Kaashoek and D. A. Wallach, *Proceedings of the Fifteenth Symposium on Operating Systems Principles*, ACM, December 1995; and "CRL version 1.0 User Documentation", K. L. Johnson, J. Adler and S. K. Gupta, , MIT Laboratory for Computer Science, Cambridge, Mass. 02139, August 1995. Both articles are available at web address www.pdos.lcs.mit.edu/crl.

Parallel applications built on top of the CRL, such as the storage manager, share data through memory "regions." Each region is an arbitrarily sized, contiguous area of memory. Regions of shared memory are created, mapped in other processes, unmapped, and destroyed by various functions of the DSM system. The DSM system used in the present invention provides a super-set of the functions that are used in the CRL DSM system. Users of memory regions synchronize their access by declaring to the DSM when they need to read from, or write to, a region, and then, after using a region, declaring the read or write complete. The effects of write operations are not propagated to other processes sharing the region until those processes declare their need for it. In addition to the basic shared memory and synchronization operations, DSM provides error handling and reliability with transactions. The full interface to inventive DSM is shown in Table 1.

TABLE 1

| DSM Method | Description |
| --- | --- |
| AddNotification(DSMRgn* i_pRgn, const IgrooveManualResetEvent * i_pEvent); | Adds a local event that will be signaled with the data in the region changes. |
| Close( ); | Shuts down the DSM. There must be no mapped regions at this client. |
| Create(UINT4 i_Size, INT4 i_CallbackParam, INCAddress i_InitialOwner, DSMRId & io_RId, DSMRgn * & o_pRgn, void * & o_pData); | Creates a new region. It also atomically maps the new region and initiates a StartWrite on the new region if Size is non-zero. Size is the initial size of the data in the new region. RId is identifier of the new region. pRgn is the new region if Size is non-zero. |
| AddDatabase(UINT2 i_DatabaseNumber); | Adds a new database to the region mapping tables. |
| DatabaseFlushNotify(UINT2 i_DatabaseNumber, TimeMillis i_StartTime); | Cleans up unused region resources. |
| Destroy(DSMRId& i_RId); | Destroys an existing region entirely. RId is a valid identifier of the region to be destroyed. |
| EndRead(DSMRgn* i_pRgn); | Closes a read operation on the region's data. pRgn is the valid region. |
| EndWrite(DSMRgn* i_pRgn); | Closes a write operation on the region's data. pRgn is the valid region. |

TABLE 1-continued

| DSM Method | Description |
|---|---|
| Flush(DSMRgn* i_pRgn); | Flushes the region from this client's local cache to the region's home client. pRgn is the valid region. |
| GetSize(DSMRgn* i_pRgn); | Returns the size(number of bytes) of the given valid region. pRgn is the valid region. |
| Init(CBSTR i_BroadcastGroup, DSMRgnMapCallback * i_pCallback = NULL, void * i_pCallbackParam = NULL, BOOL * o_pMasterClient = NULL, UINT4 i_WaitTimeOut = 1000, UINT4 i_URCSize = 1<<10, INCAddress * o_pAddress = NULL); | Initializes the DSM. BroadcastGroup is the name of the group in which this DSM client belongs. URCSize is the size of the Unmapped Regions Cache. PAddress is the Inter-node Communication Address of this DSM client. pMasterClient specifies whether this DSM client is the Master(First) client. |
| Map(const DSMRId& i_RId, INT4 i_CallbackParam, BOOL i_InitialOwner); | Maps the region to this client's memory space. RId is a valid identifier of the region to be mapped. |
| RemoveDatabase(UINT2 i_DatabaseNumber); | Removes the specified database from the region mapping tables. |
| RemoveNotification(DSMRgn* i_pRgn, const IGrooveManualResetEvent * i_pEvent); | Removes interest in changes to data in a region. |
| Resize(DSMRgn* i_pRgn, UINT4 i_Size); | Resizes the given valid region while maintaining the original data(which may be truncated if the size is decreased). pRgn is the valid region. Size is the new size. |
| GetRId(const DSMRgn* i_pRgn); | Returns the identifier for the given valid region. pRgn is the valid region. |
| SignalNotification(DSMRgn* i_pRgn); | Sets the signal that notification has occurred. |
| StartRead(DSMRgn* i_pRgn, INT4 i_CallbackParam, void * & o_pData); | Initiates a read operation on the region's data. RgnStartRead (or RgnStartWrite) must be called before the data can be read. pRgn is the valid region. |
| StartTransactionRead(DSMRgn* i_pRgn, INT4 i_CallbackParam, void * & o_pData); | Initiates a transactional read operation on the region's data. RgnStartRead (or RgnStartWrite) must be called before the data can be read. pRgn is the valid region. |
| StartTransactionWrite(DSMRgn* i_pRgn, INT4 i_CallbackParam, void * & o_pData); | Initiates a transactional write operation on the region's data. RgnStartWrite must be called before the data can be modified. pRgn is the valid region. |
| StartWrite(DSMRgn* i_pRgn, INT4 i_CallbackParam, void * & o_pData); | Initiates a write operation on the region's data. RgnStartWrite must be called before the data can be modified. pRgn is the valid region. |
| Unmap(DSMRgn* & io_pRgn); | Unmaps the region from this client's memory space. pRgn is the valid region to be unmapped. |

Each storage manager 605 and 615 comprises a DSM node that uses one or more DSM regions (not shown in FIG. 6) located in the address space of the corresponding process 600, 602. These regions contain DVO objects and classes that can be used to represent documents, elements and schema of the XML data that is managed by the storage manager. Portions of documents, usually elements and index sections, are wholly contained within a region. Although the DSM system provides a conceptually uniform node space for sharing regions, there are issues that result in the need to single out a specific node or process to perform special tasks.

Consequently, within the DSM synchronization protocol, a single node is identified as a "home node" for each region. Within the many processes running the storage manager on a single computer, one process, called the "home process", is the process that performs all disk I/O operations. To reduce the amount of data movement between processes, the home process is the home node for all regions. Other implementations are possible, in which any node may be the home for any region and any process may perform disk I/O. However, for personal computers with a single disk drive, allowing multiple processes to perform disk I/O introduces the need for I/O synchronization while not alleviating the main performance bottleneck, which is the single disk.

In accordance with the DSM operation, if a process has the most recent copy of a region, then it can read and write into the region. Otherwise, the process must request the most-recent copy from the home process before it can read and write in the region. Each DSM system 614, 624 interfaces with the message passing system 604 via an interface layer called an internode communication layer (615, 625) which isolates the DVM system from the underlying transport mechanism. It contains methods that send messages to a broadcast group, and manipulate addresses for the corresponding process and the home process.

The inventive storage manager uses shared objects as the basis for XML objects. Many systems exist for sharing objects across processes and computers. One such object-sharing model is based on the use of the shared memory facilities provided by an operating system. One of the biggest drawbacks of such a shared memory model is unreliability due to memory write failures that impact the integrity of other processes. For example, if one process is in the process of updating the state of an object and the process fails before setting the object to a known good state, other processes will either see the object in an invalid state or may blocked indefinitely waiting for the failed process to release its synchronization locks. The shared memory model also suffers from the locality constraints of shared memory in a tightly coupled multi-computer—it provides no way to share objects over a network.

Another model that provides distributed object sharing and remote method invocation is the basis for the distributed object management facilities in Java or the Object Management Group's CORBA system. Although providing the ability to share objects over a computer network, clients of such systems need to be aware of whether an object is local or remote—objects are not location independent. Performance is another drawback of this approach. All operations on an object need to be transmitted to the object server, since the server contains the only copy of the object state and serves as the synchronization point for that data.

In order to overcome these drawbacks, the inventive storage manager uses a distributed virtual object (DVO) system to provide the primitive data types that XML object types are built upon. The DVO system also provides its callers with the illusion that all data is reliably contained in one process on a single computer node, even though the data may be in multiple processes on many computers or may truly be just in one process on a single computer node.

Figure 7:
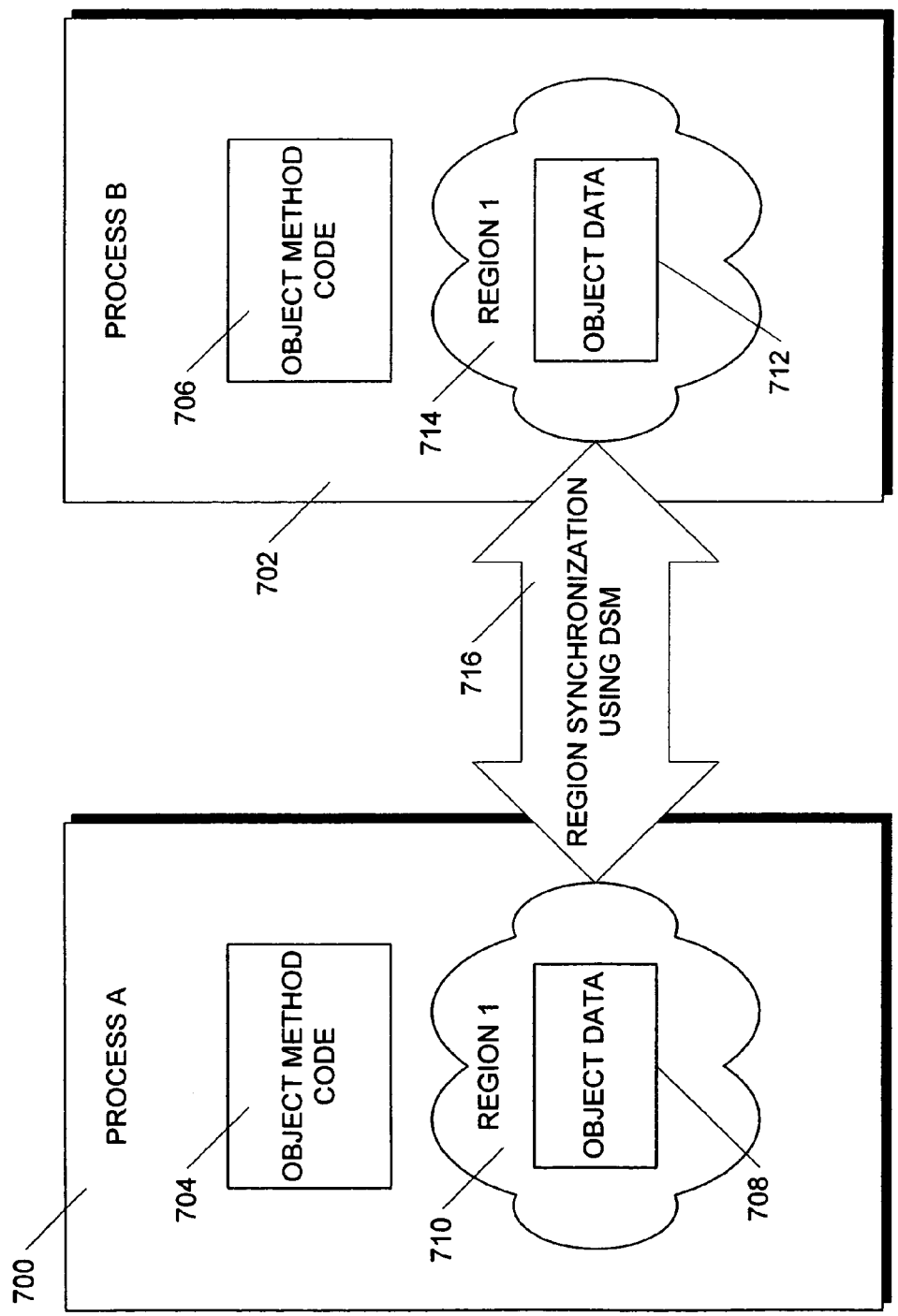
FIG. 7 illustrates the mechanism for synchronizing objects across processes.

The DVO object-sharing model is shown in FIG. 7. All processes, on all computers, that are sharing an object have the same method code. For example, process 700 and process 702 in FIG. 7 have copies of the same object. Thus, each of processes 700 and 702 has a copy of the same method code 704 and 706 in the respective process address space. The volatile data state for an object is stored in DSM regions.

Thus, the object data 708 for the object copy in process 700 is stored in region 710 in the address space of process 700. Similarly, the object data 712 for the object copy in process 702 is stored in region 714 in the address space of process 702. Object methods synchronize their access to the object's data by using the DSM synchronization functions that synchronize the regions as illustrated by arrow 716. In this manner, DVO objects are location independent, failures are contained within a single process, and multiple changes to a local object do not require data movement across the inter-node transport.

The DVO system provides basic objects that may be used as building blocks to manage XML documents for the storage manager and is divided into three functional pieces. The DVO database 610 contains objects that handle the DVO local context in each process and the shared tables that contain information about open databases and documents contained within those databases. In DVO, "databases" are conceptual storage containers and may channel objects that are ultimately stored in any kind of storage service 609. DVO documents are associated with XML or binary documents, which are visible to a client of the storage manager. DVO documents are also used to contain the indices and metadata associated with a collection.

DVO types 612 is a set of object classes that can be used within DVO documents to implement higher-level data model constructs. DVO types range from simple data containment objects through complex, scalable index structures. Each DVO type is implemented with two classes—one is a "non-shared class" that uses memory pointers in object references and the other is a "shared class" that uses logical addresses, called database pointers, for object references. The "shared class" has two sub-forms—one is the representation of the object in a shared DSM region and the other is the representation of the object stored on-disk in an object store database. The DVO system 607 provides methods to transfer objects between their shared and non-shared implementations.

The different DVO types are shown in Table 2.

TABLE 2

| DVO Type | Description |
| --- | --- |
| Binary Document | A kind of document that handles binary data. |
| B-tree Index | The type of the root of a b-tree index. It contains a description of the index, as well as the address of the root index node. |
| Btree Node | A piece of a Btree index which can contain variable numbers of records, sorted by one or more keys. |
| Collection Document | A kind of document that handles Collection documents. In addition to the Document methods, it has methods to handle the collection descriptor, indices within the collection, and read marks. |
| Document | The base type from which the other document types inherit common methods, such as Open, Close, Create, and Write. |
| Extendible Hashing | A type implementation of extendible hashing, as defined in "Extendible Hashing - A Fast Access Method for Dynamic Files", Ronald Fagin, Jürg Nievergelt, Nicholas Pippenger, H. Raymond Strong. ACM Transactions on Database Systems 4(3), pages 315-344, 1979. |
| FlatCollectionDocument | A specific kind of CollectionDocument used in shared regions. |
| FlatDocument | A specific kind of XMLDocument used in shared regions. |
| FlatNode | A specific kind of Node used in shared regions. |
| Node | The type used to store XML elements. It has methods to manage the element name, the element's parent, element content, element attributes, links to other elements, and change notifications. |

TABLE 2-continued

| DVO Type | Description |
| --- | --- |
| Ordered Bucket | A kind of index which supports key ordered sorting (integer, double, string) |
| Ordered Index | A type that provides a collated data vector. It has methods for adding, removing, and changing key/data pairs, managing index cursors, and managing parent and sub-indicies. |
| Ordered Index Types | Data types, called records and fields, that can be stored in ordered indices. |
| Ordinal Ordered Index | A kind of index that support ordinal addressing. It is conceptually similar to vector that allows any entry to be addressed by position (e.g., vec[14]). In addition to the index methods, it has methods to move entries to specific positions within the index. |
| Red-Black Index | A kind of ordered index that implements balancing using the red-black binary tree algorithm. |
| W32BinaryDocument | A specific kind of binary document for 32-bit Windows platforms. |
| XML Document | A kind of document that handles XML documents. In addition to the Document methods, it has methods to handle schemas and indexes. |

The DVO system 607 objects isolate the upper levels of DVO from physical storage and process locality issues. The DVO system objects use DSM for invoking and handling requests to and from the home process. Requests include operations such as opening, closing, and deleting a database, finding documents in a database, and opening, closing, deleting, and writing database documents. The DVO system 607 in the master process 600 can also retrieve DVO objects from a storage service 609. A storage service, such as service 609, is a utility program that stores and retrieves information from a persistent medium and is responsible for the physical integrity of a container, database or file. It ensures that all updates are durable and that all internal data structures (e.g., redirection tables, space allocation maps) are always consistent on disk. Other processes, such as process 602 cannot access the storage service 609 directly, but can access the system indirectly via its DSM regions 624.

The storage manager 605 can operate with different types of physical storage systems, including container or object stores, stream file systems and ZIP files. In order to achieve atomic commits, the object store storage service can be implemented using page-oriented input/output operations and a ping-pong shadow page table.

Individual storage manager methods are atomic. Multiple storage manager operations, even operations on different documents, may be grouped into "transactions." Transactions not only protect XML data integrity, but they also improve performance because they enable the storage manager to reduce the number of region lock operations and reduce the amount of data movement over the message passing system.

The storage manager supports both read-write and read-only transactions built on DSM synchronization primitives described in the DSM documentation referenced above, which primitives insure consistency in multiple processes or computers. Read-write transactions provide for the atomicity and consistency of a set of database read and write operations. Each region that is changed as part of a transaction will be kept in a "locked" state until the transaction is committed or aborted. This prevents operations that are not part of the transaction from seeing the changes. Further, each transaction stores a "before image" of the regions it modifies so that, if the transaction is aborted (as a result of an explicit API call or an exception), the effects of the transaction can be undone.

Depending on the performance requirements, an alternative implementation would write undo information rather than storing the full "before image." A read-only transaction uses the same interface as a read-write transaction. A read-only transaction ensures that multiple read operations are consistent. Like other transactions, it uses DSM functions to keep all read regions in a "read state" until it is finished.

In addition, checkpoints can be used to ensure that changes are persistent and provide durability for storage manager operations. A checkpoint may be performed at any time. Checkpoints are used in conjunction with data recovery logging. All operations write "redo" information to a sequential recovery log file when they are committed. When the checkpoint is committed, the recovery log file will be flushed to persistent storage and will ensure that the operations can be recovered. Since transactions do not write "redo" information until they are committed, if a checkpoint operation is commenced in the middle of a transaction, the transaction operations will not be flushed.

Transactions are scoped to a thread and a database. Once a transaction is started on a thread for a particular database, that transaction will be automatically used for all subsequent storage manager operations on that database and thread. An extension of conventional operating system threads is used, so that transactions correctly handle calls that need to be marshaled to other threads, for example, a user interface thread, using the Groove system's simple marshaler. Storage manager calls made on a thread and database that doesn't have a transaction started will cause the storage manager to create a "default transaction" that will be committed just before the call ends. Alternatively, starting a new transaction on a thread and database that already has an existing transaction in progress will cause the new transaction to automatically "nest" in the existing transaction. Nested transactions provide the ability to roll back the system within the outer transaction. In particular, inner, nested transactions are not finally committed until the outermost transaction is committed. For example, if a nested transaction is committed, but the containing transaction is later aborted, the nested transaction will be aborted.

Figure 8:
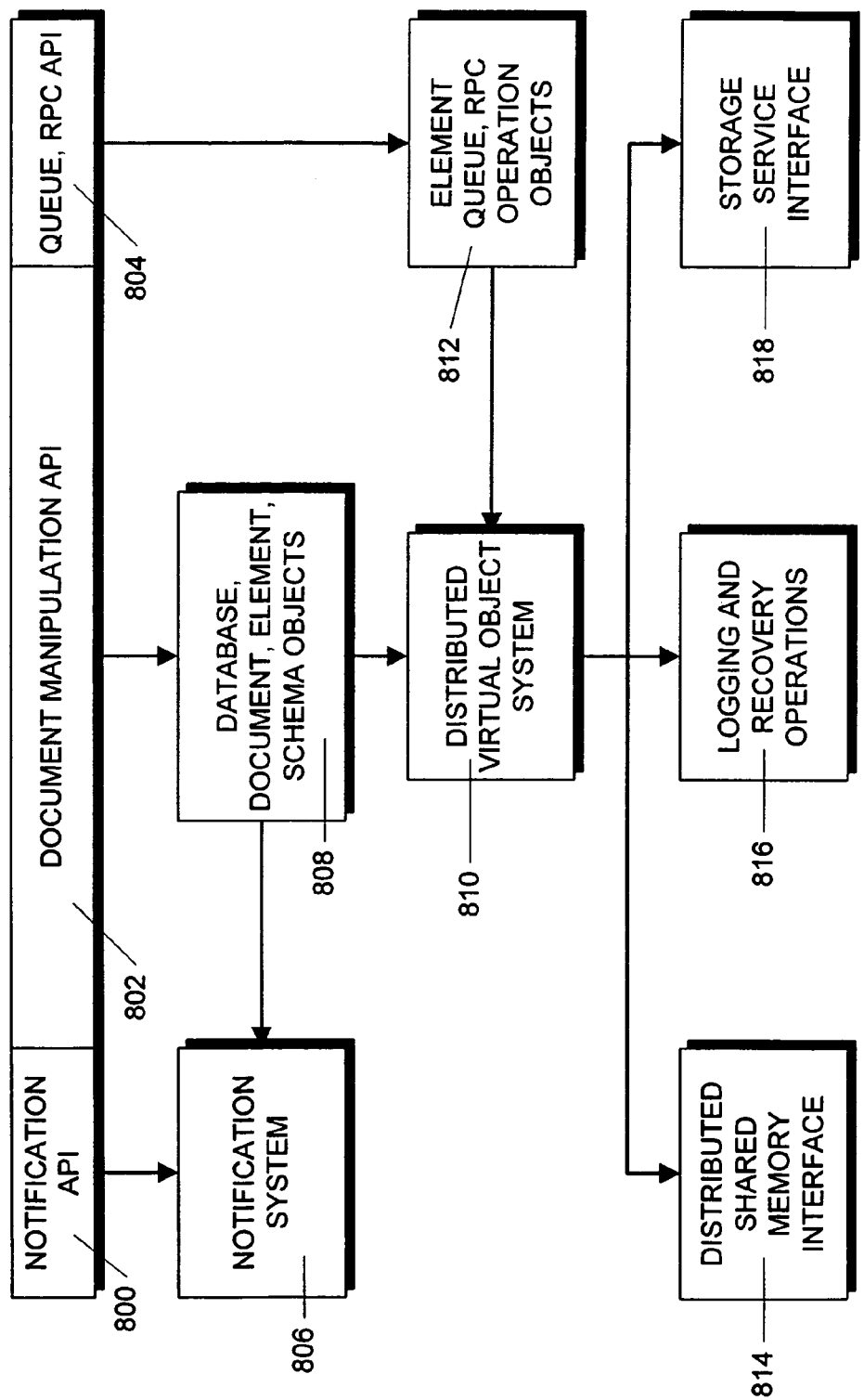
FIG. 8 is an illustration that shows the major control paths from the storage manager APIs through the major internal parts of the storage manager.

In a preferred embodiment of the invention, the storage manager is implemented in an object-oriented environment. Accordingly, both the storage manager itself and all of the document components, such as documents, elements, entities, etc. are implemented as objects. These objects, their interface, the underlying structure and the API used to interface with the storage manager are illustrated in FIG. 8. The API is described in more detail in connection with FIGS. 9-11. Referring to FIG. 8, the storage manager provides shared access to documents, via the document manipulation API 802, but, in order to enable a full programming model for client applications, additional communication and synchronization operations are provided, within the context of a document. For example, the storage manager provides queued element operations, which enable one process to send an element to another process via the Queue API 804. Elements can be sent by value (a copy of the whole element) or by reference to the element. Synchronization operations are also provided to allow one or more threads to wait for an element to be enqueued to a given queue. The storage manager also provides RPC-style element communication and synchronization, via the RPC API 804.

Other client components may need to be aware of when documents are created in or deleted from storage manager. Accordingly, the storage manager provides an interface to an interest-based notification system for those client components via notification API 800. The notification system 806 provides notifications to client components that have registered an interest when a document is created or deleted.

Document data is represented by a collection of objects including database objects, document objects, element objects and schema objects 808. The objects can be directly manipulated by means of the document manipulation API 802.

The document related objects 808 are actually implemented by the distributed virtual object system 810 that was discussed in, detail above. The distributed virtual object system 810 can also be manipulated by element queue and RPC objects 812 under control of the queue and RPC API 804.

The distributed virtual object system 810 communicates with the distributed shared memory via interface 814 and communicates with the logging operations via interface 816. Similarly, the distributed virtual object system can interact with the storage services via interface 818.

The following is a description of the interfaces for each of the objects used to implement a preferred embodiment of the inventive storage manager. These object are designed in accordance with the Common Object Model (COM) promulgated by Microsoft Corporation, Redmond, Wash., and can be manipulated in memory as COM objects. However, COM is just one object model and one set of interface methodologies. The invention could also be implemented using other styles of interface and object models, including but not limited to the Java and CORBA object models.

Figure 9:
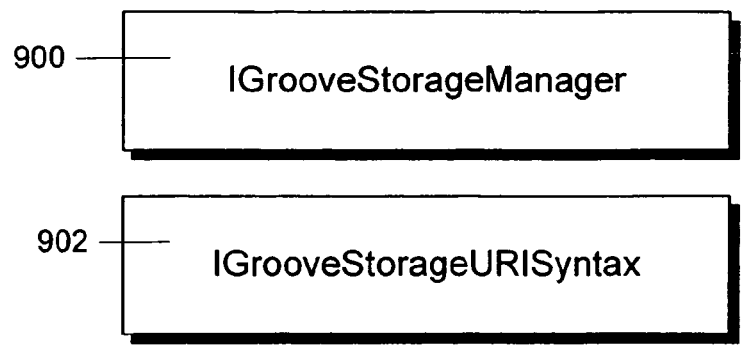
FIG. 9 is an illustration of the storage manager interface constructed in accordance with an object-oriented implementation of the invention.

FIG. 9 illustrates object interfaces for a storage manager object. An interface 900 (IGrooveStorageManager) encapsulates the basic framework for the storage manager. This interface is a subclass of an IDispatch interface which is a common class defined by the COM model. Table 3 defines the methods included in the storage manager interface.

TABLE 3

| Interface IGrooveStorageManager : IDispatch | |
|---|---|
| CreateDatabase (BSTR i__DatabaseURI, VARIANT__BOOL i__Temporary, VARIANT__BOOL i__SingleProcess, IUnknown * i__pSecurityContext, VARIANT__BOOL i__CreateOnCheckpoint, IgrooveDatabase ** o__ppDatabase); | Creates a database. A database can be either temporary or permanent, and single or multi-process. The DatabaseURI specifies the location of the database. |
| CreateOrOpenDatabase (BSTR i__DatabaseURI, VARIANT__BOOL i__Temporary, VARIANT__BOOL i__SingleProcess, IUnknown * i__pSecurityContext, VARIANT__BOOL i__CreateOnCheckpoint, VARIANT__BOOL * o__pCreated, IgrooveDatabase ** o__ppDatabase); | Creates a new database or opens an existing database. |
| CreateTemporaryElement (BSTR i__Name, Iunknown * i__pParent, IgrooveElement ** o__ppElement); | Creates a temporary element. |
| CreateTemporaryXMLDocument (BSTR i__NamePrefix, BSTR i__SchemaURI, IUnknown* i__pAdditionalSchemaURIs, IgrooveXMLDocument ** o__ppXMLDocument); | Creates an empty temporary document with a unique URI |
| CreateTransform (BSTR i__CollectionDescriptorURI, BSTR i__SecondaryDescriptorURI, BSTR i__CollectionDescriptorName, IgrooveTransform ** o__ppTransfom); | Creates a transformation interface. |
| DeleteDatabase (BSTR i__DatabaseURI); | Deletes a database. |
| IsHomeProcess (VARIANT__BOOL * o__pHomeProcess); | Determine whether we are the home process |
| OpenCrossProcessSemaphore (BSTR i__Name, VARIANT__BOOL i__Reentrant, IgrooveCrossProcessSemaphore ** o__ppSemaphore); | Creates a semaphore object that can be used to synchronize activity in different processes. If the semaphore is not Reentrant, repeated attempts to lock the semaphore within the same thread and process will block. |

TABLE 3-continued

| Interface IGrooveStorageManager : IDispatch | |
|---|---|
| OpenDatabase (BSTR i_DatabaseURI, VARIANT_BOOL i_SingleProcess, Iunknown * i_pSecurityContext, IgrooveDatabase ** o_ppDatabase); | Open an existing database. |
| OpenDatabaseURIEnum(IGrooveBSTREnum ** o_ppDatabaseURI); | Returns an Enumeration of the databases that are currently open. |

Another interface 902 (IGrooveStorageURISyntax) is used by a client of a storage manager that needs to perform operations on parts of standard names, which are in the form of Uniform Resource Identifiers (URIs). Table 4 includes the methods for the IGrooveStorageURISyntax interface.

TABLE 4

| Interface IGrooveStorageURISyntax : IDispatch | |
|---|---|
| BuildDatabaseURI (BSTR i_ServiceName, BSTR i_DatabasePath, VARIANT_BOOL i_Relative, BSTR *o_pURI); | Builds a database URI from its pieces. |
| BuildDocumentURI (BSTR i_ServiceName, BSTR i_DatabasePath, BSTR i_DocumentName, VARIANT_BOOL i_Relative, BSTR * o_pURI); | Builds a document URI from its pieces. |
| MakeAbsolute (BSTR i_RelativeURI, BSTR * o_pAbsoluteURI); | Given a relative URI within the scope of this database, return an absolute URI. |
| MakeRelative (BSTR i_AbsoluteURI, BSTR * o_pRelativeURI); | Given an absolute URI within this database, return a relative URI within the scope of this database. |
| OpenDatabasePath (BSTR I_URI, BSTR * o_pDatabasePath); | Returns the directory path portion of a URI. |
| OpenDocumentName (BSTR i_URI, BSTR * o_pDocumentName); | Returns the document name portion of a URI. |
| OpenPersistRootPath (BSTR * o_pPath); | Returns the directory path to the root of the Groove persistent data directories. |
| OpenServiceName (BSTR i_URI, BSTR * o_pServiceName); | Returns the storage service portion of a URI. |
| Parse (BSTR i_URI BSTR * o_pServiceName, BSTR * o_pDatabasePath, BSTR * o_pDocumentName); | Parses the pieces of the given URI. |

Figure 10:
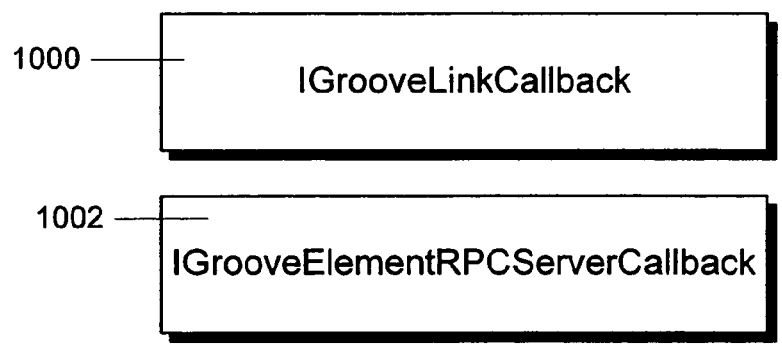
FIG. 10 is an illustration of the interfaces constructed in accordance with an object-oriented implementation of the invention, that are defined by the storage manager and may be called during the processing of links or element RPCs.

FIG. 10 illustrates the notification system interfaces. Interface 1000 (IGrooveLinkCallback) is an interface for use by a client of a storage manager that needs to be notified during the input processing of XML document or element when a definition for a link is found. The interface includes the methods defined in Table 5.

TABLE 5

| Interface IGrooveLinkCallback : IDispatch | |
|---|---|
| HandleLink (IGrooveElement * i_pLinkElement, IGrooveByteInputStream * i_pLinkData); | Called when the specified element contains a link attribute definition. |

Another interface 1002 (IGrooveRPCServerCallback) is used by a client of a storage manager that needs to handle remote procedure calls (RPCs) on elements within XML documents. RPC server callbacks are a sub-class of the "util" base class (described below), that is, all of the methods for IGrooveElementUtilBase also apply to IGrooveRPCServerCallback. Table 6 defines the methods used in the storage manager RPC server callback interface.

TABLE 6

| Interface IGrooveElementRPCServerCallback : IDispatch | |
|---|---|
| HandleCall (IGrooveElement * i_pInput, IgrooveElement ** o_ppOutput); | Handle a RPC, receiving input parameters in the Input element and returning output parameters in the Output element. |

Figure 11:
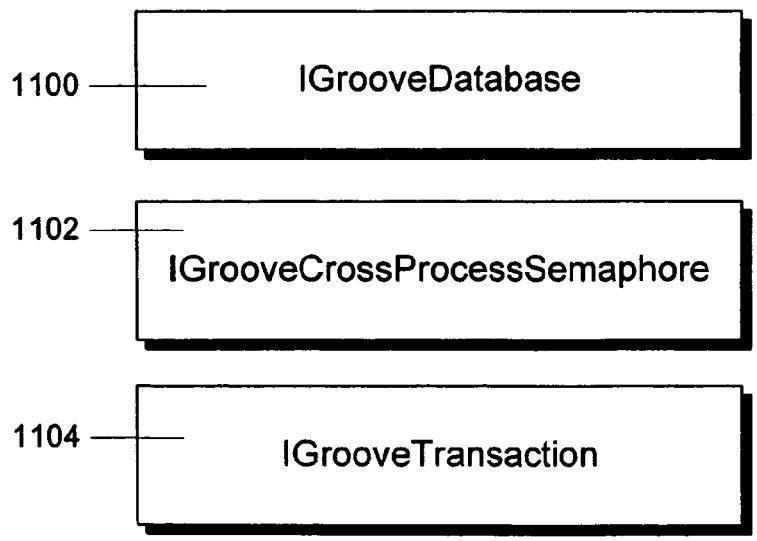
FIG. 11 is an illustration of the database and transaction interfaces constructed in accordance with an object-oriented implementation of the invention.
Figure 12:
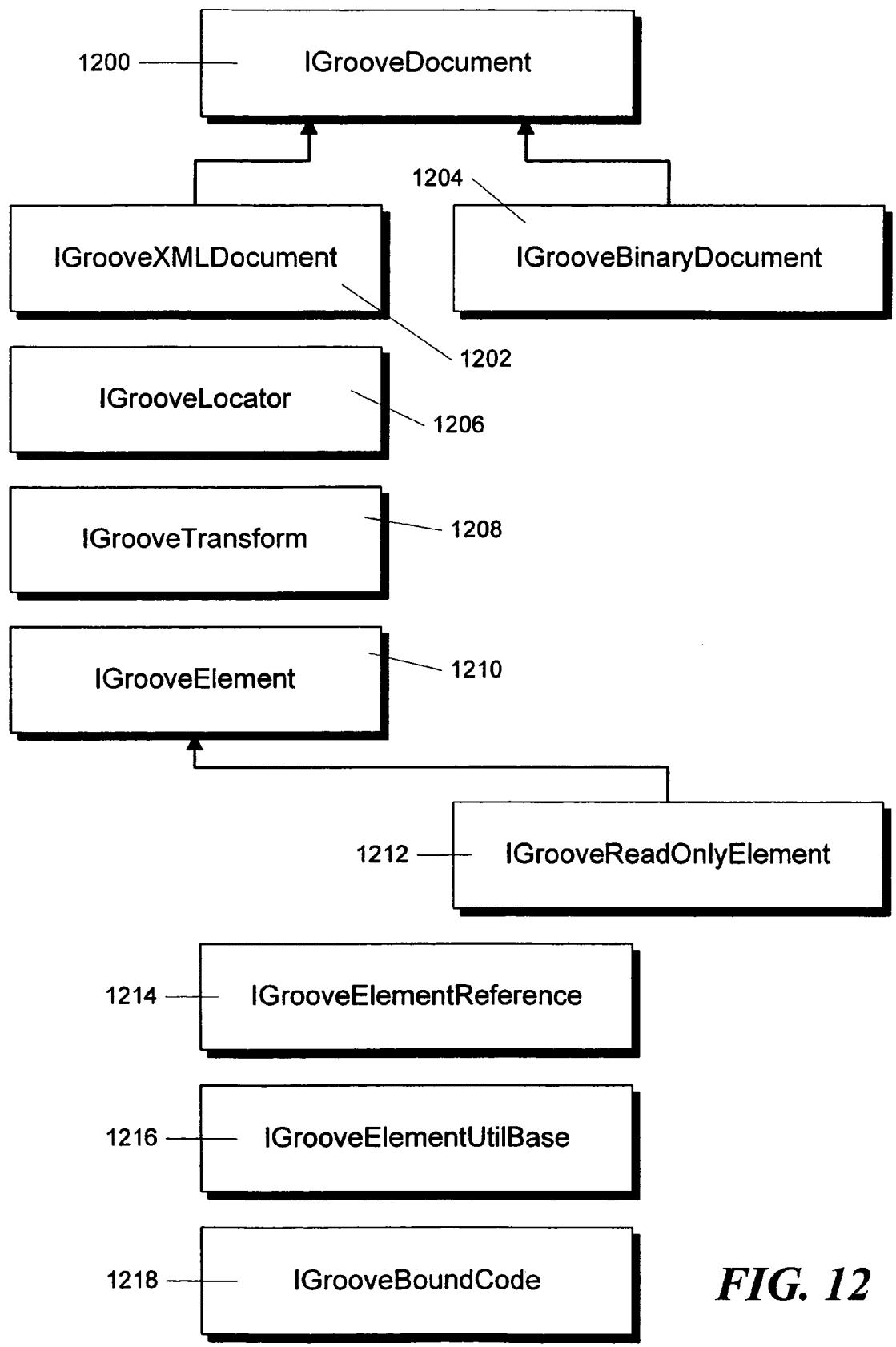
FIG. 12 is an illustration of the document and element interfaces constructed in accordance with an object-oriented implementation of the invention.
Figure 13:
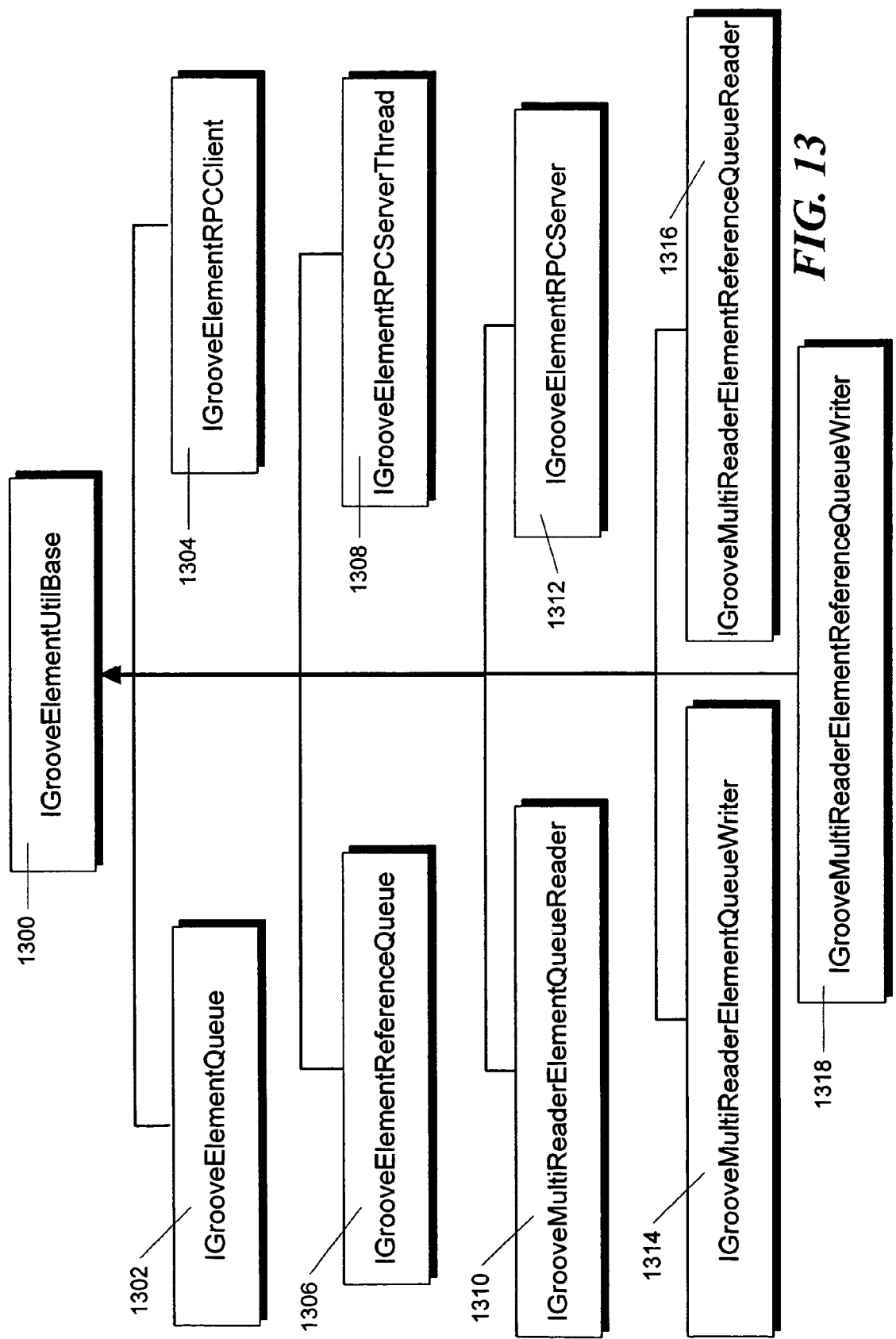
FIG. 13 is an illustration of the element communication and synchronization interfaces constructed in accordance with an object-oriented implementation of the invention.

FIGS. 11, 12 and 13 illustrate the document manipulation interfaces and the queue and RPC interfaces. In particular, FIG. 11 shows the interfaces used to manipulate databases. An interface 1100 (IGrooveDatabase) is used by a client of a storage manager that needs to manage the databases in which documents are stored. It includes the methods in Table 7.

TABLE 7

| Interface IGrooveDatabase : IDispatch | |
|---|---|
| Checkpoint ( ); | Creates a durable point of state for the database. |
| ClearDataLost ( ); | Clears the database flag that indicates data may have been lost since the database was opened or the last transaction was committed. |
| CreateBinaryDocumentFromStream (IgrooveByteInputStream *i__pStream, BSTR I__DocumentName, IgrooveBinaryDocument ** o__ppDocument); | Creates a binary document with the specified name in the database. |
| CreateOrOpenXMLDocument (BSTR i__DocumentName, BSTR i__RootElementName, BSTR i__SchemaURI, IUnknown * i__pAdditionalSchemaURIs, VARIANT_BOOL * o__pCreated, IGrooveXMLDocument ** o__ppDocument); | Opens the specified XML document; creates an empty document with the specified name and schema it if it doesn't already exist. |
| CreateXMLDocument (BSTR i__DocumentName, BSTR i__RootElementName, BSTR i__SchemaURI, IUnknown * i__pAdditionalSchemaURIs, IGrooveXMLDocument ** o__ppDocument); | Creates an empty XML document with the specified name and schema in the database. |
| CreateXMLDocumentFromStream (IGrooveByteInputStream * i__pStream, GrooveParseOptions i__ParseOptions, BSTR i__DocumentName, BSTR i__SchemaURI, IUnknown * i__pAdditionalSchemaURIs, IUnknown * i__pLinkCallback, IGrooveXMLDocument ** o__ppDocument); | Given a stream of bytes, representing one of the supported character set encodings of a XML document, creates an XML document in the database. |
| DeleteDocument (BSTR i__DocumentName); | Deletes the named document. |
| DocumentExists (BSTR i__DocumentName, VARIANT_BOOL * o__pDocumentExists); | Given the specified document name, checks for the existence of the document in the database. |
| IsTransactionInProgress (VARIANT_BOOL * o__pTransactionInProgress); | Returns TRUE if a transaction is in progress. |
| OpenBinaryDocument (BSTR i__DocumentName, IGrooveBinaryDocument ** o__ppDocument); | Opens the specified binary document. |
| OpenCrossProcessSemaphore (BSTR i__Name, VARIANT_BOOL i__Reentrant, IGrooveCrossProcessSemaphore ** o__ppSemaphore); | Creates a new cross process synchronization object. If Name is not specified, the default name for the database is used. If the semaphore is not Reentrant, repeated attempts to lock the semaphore within the same thread and process will block. |
| OpenDocumentNameEnum (VARIANT_BOOL i__OpenOnly, IGrooveBSTREnum ** o__ppDocumentNames); | Returns an enumeration of the documents currently in a database. |
| OpenTransaction (VARIANT_BOOL i__BeginLock, VARIANT_BOOL i__ReadOnly, VARIANT_BOOL i__BeginTransaction, VARIANT_BOOL i__Reentrant, BSTR i__LockName, IGrooveTransaction ** o__ppTransaction); | Creates a new transaction on the database. BeginLock specifies whether the database cross process semaphore should be locked. BeginTransaction specifies whether the transaction should start now. If LockName is not specified, the default name for the database is used. If the semaphore is not Reentrant, repeated attempts to lock the semaphore within the same thread and process will block. |
| OpenURI (BSTR * o__pDatabaseURI); | Returns the URI for this database. |
| OpenXMLDocument (BSTR i__DocumentName, IGrooveXMLDocument ** o__ppDocument); | Opens the specified XML document. |
| WasDataLost (VARIANT_BOOL * o__pDataLost); | Returns the value of a flag indicating whether data may have been lost since the database was opened or the last transaction was committed. |

Table 8 illustrates the methods for an interface 1102 (IGrooveCrossProcessSemaphore) for a client of a storage manager that needs to synchronize access among processes.

TABLE 8

| Interface IGrooveCrossProcessSemaphore : IDispatch | |
| --- | --- |
| DoLock (VARIANT_BOOL i_ReadOnly); | Locks the semaphore. If ReadOnly is TRUE, only retrieval operations may be performed on the database, otherwise, any operation may be performed. |
| DoUnlock ( ); | Unlocks the semaphore. |

Table 9 illustrates an interface 1104 (IGrooveTransaction) for a client of a storage manager that needs to group operations within a database. Transactions are a sub-class of cross-process semaphores, that is, all of the methods for IGrooveCrossProcessSemaphore also apply to IGrooveTransaction. The storage manager transaction interface includes the following methods:

TABLE 9

| Interface IGrooveTransaction : IGrooveCrossProcessSemaphore | |
| --- | --- |
| Abort ( ); | Ends the transaction. All work done to the database since the start of the transaction is discarded. |
| Begin (VARIANT_BOOL i_ReadOnly); | Starts a transaction. If ReadOnly is false, the database may be updated. |
| BeginIndependent (VARIANT_BOOL i_ReadOnly); | Starts another transaction for this thread. Only one independent transaction is allowed per thread. |

TABLE 9-continued

| Interface IGrooveTransaction : IGrooveCrossProcessSemaphore | |
| --- | --- |
| Commit ( ); | Ends the transaction. All work done to the database since the start of the transaction is reliably stored in the database. |

FIG. 12 shows interfaces which allows clients of the storage manager to manipulate documents and elements within those documents. Table 10 illustrates an interface 1200 (IGrooveDocument) for a client of a storage manager that needs to manage documents within a database. The storage manager document interface includes the following methods:

TABLE 10

| Interface IGrooveDocument : IDispatch | |
| --- | --- |
| OpenCrossProcessSemaphore (BSTR i_Name, VARIANT_BOOL i_Reentrant, IgrooveCrossProcessSemaphore ** o_ppSemaphore); | Creates a new cross process synchronization object. If Name is not specified, the URI for the document is used. If the semaphore is not Reentrant, repeated attempts to lock the semaphore within the same thread and process will block. |
| OpenDatabase (IGrooveDatabase ** o_ppDatabase); | Returns an interface to the database object that contains this document. |
| OpenName (BSTR * o_pDocumentName); | Returns the document name. |
| OpenURI (BSTR * o_pURI); | Returns the URI that identifies this document. |

Table 11 illustrates an interface 1202 (IGrooveXMLDocument) for a client of a storage manager that needs to manage XML documents within a database. XML documents are a sub-class of documents, that is, all of the methods for IGrooveDocument also apply to IGrooveXMLDocument. The storage manager XML document interface includes the following methods:

TABLE 11

| interface IGrooveXMLDocument : IGrooveDocument | |
| --- | --- |
| GenerateGrooveID (BSTR i_GrooveIDBase, double * o_pGrooveID); | Generates an 8 byte identifier from the string identifier I_GrooveIDBase. |
| ConvertGrooveIDToSerializedGrooveID (double i_GrooveID, BSTR * o_pGrooveIDString); | Converts an 8 byte identifier to the string i_GrooveID. |
| ConvertSerializedGrooveIDToGrooveID (BSTR i_GrooveIDString, double * o_pGrooveID); | Converts a string version of a Groove identifier to an 8 byte version. |
| CreateElement (BSTR i_Name, IUnknown * i_pParent, IGrooveElement ** o_ppElement); | Creates a new element with the supplied Tag; the tag cannot be altered once created. If a Parent reference is supplied, the new element is created as a child of that parent. |
| CreateElementCopy (IGrooveElement * i_pSource, IGrooveElement * i_pParent, VARIANT_BOOL | Does a deep/shallow copy of the specified element and all of its children (recursively for deep; just the one level for shallow), putting |

TABLE 11-continued

| interface IGrooveXMLDocument : IGrooveDocument | |
|---|---|
| i_ShallowCopy, IGrooveElement ** o_ppElement); | the new element(s) in under the Parent element. |
| CreateElementFromSchema (BSTR i_Name, IGrooveElement * i_pParent, IGrooveElement ** o_ppElement); | Creates an element that conforms to the element's definition in the schema. Creates the element, its attributes, and any child elements. |
| CreateElementFromStream (IGrooveByteInputStream * i_pStream, GrooveParseOptions i_ParseOptions, IUnknown * i_pParent, IUnknown * i_pLinkCallback, IGrooveElement ** o_ppElement); | Using a parser, creates an element, reads from a byte input stream and creates elements and attributes from the text stream as necessary, inserting them into the element, which is then returned to the caller. If a Parent reference is supplied, the new element is created as a child of that parent. |
| CreateLocator (IGrooveLocator ** o_ppLocator); | Returns the interface to a new locator object. |
| FindElementByID (BSTR i_ID, IGrooveElement ** o_ppElement, VARIANT_BOOL * o_pFound); | Looks for an element of the specified ID and returns a boolean value if found. |
| OpenElementByID (BSTR i_ID, IGrooveElement **o_ppElement); | Looks for an element of the specified ID. |
| OpenElementEnumByAttributeValue (BSTR i_ElementName, BSTR i_AttributeName, BSTR i_AttributeValue, IGrooveElementEnum **o_ppElementEnum); | Returns an enumeration of all of the elements within the document that have the named attribute with the specified value. |
| OpenElementEnumByAttributeValueAs Bool (BSTR i_ElementName, BSTR i_AttributeName, VARIANT_BOOL i_AttributeValue, IGrooveElementEnum **o_ppElementEnum); | Returns an enumeration of all of the elements within the document that have the named attribute with the specified boolean type value. |
| OpenElementEnumByAttributeValueAs Double (BSTR i_ElementName, BSTR i_AttributeName, double i_AttributeValue, IGrooveElementEnum **o_ppElementEnum); | Returns an enumeration of all of the elements within the document that have the named attribute with the specified double floating type value. |
| OpenElementEnumByAttributeValueAs Long (BSTR i_AttributeName, long i_AttributeValue, IGrooveElementEnum **o_ppElementEnum); | Returns an enumeration of all of the elements within the document that have the named attribute with the specified long integer type value. |
| OpenElementEnumByLocator (BSTR i_LocatorText, IGrooveElementEnum ** o_ppElementEnum); | Returns an element enumerator with references to all elements satisfying the specified element locator expression. If there are no matching elements, the element enumerator will be created with no contents. |
| OpenElementEnumByName (BSTR i_Name, IGrooveElementEnum ** o_ppElementEnum); | Returns an enumeration of all of the elements within the document that have the specified tag name. |
| OpenMetaElement (IGrooveElement ** o_ppElement); | Returns the interface to the meta element that defines this XML document. |
| OpenRootElement (IGrooveElement ** o_ppRootElement); | Opens the root element for the XML document. |

Table 12 illustrates the methods for an interface 1204 (IGrooveBinaryDocument) for a client of a storage manager that needs to manage binary documents within a database. Binary documents are a sub-class of documents, that is, all of the methods for IGrooveDocument also apply to IGrooveBinaryDocument.

TABLE 12

| interface IGrooveBinaryDocument : IGrooveDocument | |
|---|---|
| OpenByteInputStream (IGrooveByteInputStream ** o_ppByteInputStream); | Returns the interface to a byte stream object that can be used to read bytes within the binary document. |

Table 13 illustrates an interface 1206 (IGrooveLocator) for a client of a storage manager that needs to search for elements using locator queries as defined in a specification called XSLT. Details of the XSLT specification can be found at web address www.w3.org/TR/xslt. The storage manager locator interface includes the following methods:

TABLE 13

| interface IGrooveLocator : IDispatch | |
|---|---|
| FindElement (BSTR i__LocatorStr, IGrooveElement * i__pContextElement, IGrooveElement ** o__ppElement, VARIANT__BOOL * o__pFound); | Returns an interface to the element object that satisfies the search specified by the Locator string within the scope of the context element. |
| Invalidate (VARIANT__BOOL i__AssignNewIDs); | Clears the state information in the interface instance. |
| OpenElementEnum (BSTR i__LocatorStr, IGrooveElement * i__pContextElement, VARIANT__BOOL i__Sort, BSTR i__SortConstraint, BSTR i__SortKey, GrooveSortOrder i__SortOrder, IGrooveElementEnum ** o__ppElements); | Returns an enumerator of all elements that match the Locator string, collated according to the specified sorting criteria. |
| OpenElementEnumWithTumblers (BSTR i__LocatorStr, IGrooveElement *i__pContextElement, VARIANT__BOOL i__RelativeTumblers, IGrooveBSTREnum ** o__ppTumblers, VARIANT__BOOL i__Sort, BSTR i__SortConstraint, BSTR i__SortKey, GrooveSortOrder i__SortOrder, IGrooveElementEnum ** o__ppElements); | Perform the search specified by the Locator string on the elements pointed to by the context element, returning the tumbler values for each match as well as the matching elements, collated according to the specified sorting criteria. |
| OpenText (BSTR i__LocatorStr, IGrooveElement * i__pContextElement, BSTR * o__pValue); | Returns the text from element or attribute that satisfies the search specified by the Locator string within the scope of the context element. |

Table 14 illustrates an interface 1208 (IGrooveTransform) for a client of a storage manager that needs to perform XML document transformations as defined in XSLT. The storage manager transform interface includes the following methods:

TABLE 14

| Interface IGrooveTransform : IDispatch | |
|---|---|
| TransformXMLDocument (IGrooveXMLDocument * i__pXMLDocument, IGrooveElement * i__pStartElement, BSTR i__SortRule, long i__StartElementNum, long i__NumElements, IGrooveXMLDocument * io__pResultDocument, VARIANT__BOOL i__AlwaysOutputHeader, long * o__pElementsProcessed); | Transforms the input XML document, returning the result of the transformation in ResultDocument. |
| TransformElement (IGrooveElement * i__pContextElement, BSTR i__TansformationTemplate, IGrooveXMLDocument ** o__ppResultDocument); | Transforms the input ContextElement, returning the result of the transformation in ResultDocument. |

Table 15 illustrates an interface 1210 (IGrooveElement) which allows a client of a storage manager to manipulate elements within XML documents. The storage manager element interface includes the following methods:

TABLE 15

| Interface IGrooveElement : IDispatch | |
|---|---|
| AppendContent (BSTR i__Text, GrooveContentType i__Type); | Inserts the kind of content as the last of its type within this element. |
| AppendContentElement (IGrooveElement * i__pElement); | Inserts the element as the last content element. |
| AppendContentProcessingInstruction (BSTR i__Target, BSTR i__Text); | Inserts a processing instruction, with target Target, as the last processing instruction. |

TABLE 15-continued

| Interface IGrooveElement : IDispatch | |
|---|---|
| CreateElement (BSTR i_Name, IGrooveElement * i_pParent, IGrooveElement ** o_ppElement); | Create a new element in the same document. |
| CreateElementCopy (IGrooveElement * i_pSource, IGrooveElement * i_pParent, VARIANT_BOOL i_ShallowCopy, IGrooveElement ** o_ppElement); | Does a deep/shallow copy of the specified element and all of its children (recursively for deep; just the one level for shallow), putting the new element(s) in the destination document. The returned element must be attached into the document's element tree. |
| CreateElementFromSchema (BSTR i_Name, IGrooveElement * i_pParent, IGrooveElement ** o_ppElement); | Creates an element that conforms to the element's definition in the schema. Creates the element, its attributes, and any child elements. |
| CreateElementRPCClient (IGrooveElementRPCClient **o_ppRPCClient); | Creates and returns the interface to the element RPC client. |
| CreateElementRPCServer (IGrooveElementRPCServer ** o_ppRPCServer); | Creates and returns the interface to the element RPC server. |
| CreateElementRPCServerThread (IGrooveElementRPCServerCallback * i_pCallback, IGrooveElementRPCServerThread ** o_ppRPCServerThread); | Creates and returns the interface to the element RPC server thread. |
| CreateLink (IGrooveDocument * i_pDocument, BSTR i_Title, BSTR i_Role, GrooveXLinkShow i_Show, GrooveXLinkActuate i_Actuate, GrooveXLinkSerialize i_Serialize); | Creates a link to another document, using the specified XLink parameters. |
| DecrementAttributeAsLong (BSTR i_Name, long * o_pOldValue); | Subtracts 1 from the value of a long integer type attribute. |
| Delete ( ); | Permanently removes the element from the document. No further operations may be performed on a deleted element |
| DeleteAllAttributes ( ); | Removes all attributes from the element. |
| DeleteAllContent ( ); | Removes all child content elements and text from the element and deletes them from the document. |
| DeleteAttribute (BSTR i_Name); | Removes the named attribute from the element. |
| DeleteContent (long i_Ordinal); | Removes the content at the specified position from the element. |
| DeleteLinkAttributes ( ); | Removes all attributes that are links from the element. |
| DetachFromParent ( ); | Removes this element from the content of its parent. The element is still part of the document and must be reattached or destroyed before it is released. |
| DoesAttributeExist (BSTR i_Name, VARIANT_BOOL * o_pFound); | Returns whether the attribute is set on the element. |
| Duplicate (IGrooveElement * i_pTargetElement, VARIANT_BOOL i_ShallowDuplicate); | Make the specified target element a duplicate of this element, overriding attributes and, if ShallowDuplicate is FALSE, all descendent elements. |
| FindAttribute (BSTR i_Name, BSTR * o_pValue, VARIANT_BOOL * o_pFound); | Gets any arbitrary attribute as text. If the attribute is not in the element, Found is FALSE and no value is returned. |
| FindAttributeAsBinary (BSTR i_Name, IGrooveByteInputStream ** o_ppValue, VARIANT_BOOL *o_pFound); | Gets any arbitrary attribute as Binary. The attribute must have been set as the given type or be specified as that type in the document schema. If the attribute is not in the element, Found is FALSE and no value is returned. |
| FindAttributeAsBinaryArray (BSTR i_Name, SAFEARRAY(BYTE) * o_ppValue, VARIANT_BOOL * o_pFound); | Gets any arbitrary attribute as Binary and return the value in an array. The attribute must have been set as the given type or be specified as that type in the document schema. If the attribute is not in the element, Found is FALSE and no value is returned. |
| FindAttributeAsBinaryToStream (BSTR i_Name, IGrooveByteOutputStream * i_pStream, VARIANT_BOOL *o_pFound); | Gets any arbitrary attribute as Binary and returns the value in a stream. The attribute must have been set as the given type or be specified as that type in the document schema. If the attribute is not in the element, Found is FALSE and no value is returned. |

TABLE 15-continued

| Interface IGrooveElement : IDispatch | |
|---|---|
| FindAttributeAsBool (BSTR i_Name, VARIANT_BOOL * o_pValue, VARIANT_BOOL * o_pFound); | Gets any arbitrary attribute as Boolean. The attribute must have been set as the given type or be specified as that type in the document schema. If the attribute is not in the element, Found is FALSE and no value is returned. |
| FindAttributeAsDouble (BSTR i_Name, double * o_pValue, VARIANT_BOOL * o_pFound); | Gets any arbitrary attribute as Double. The attribute must have been set as the given type or be specified as that type in the document schema. If the attribute is not in the element, Found is FALSE and no value is returned. |
| FindAttributeAsGrooveID (BSTR i_Name, double * o_pValue, VARIANT_BOOL * o_pFound); | Gets any arbitrary attribute as a Groove identifier. The attribute must have been set as the given type or be specified as that type in the document schema. If the attribute is not in the element, Found is FALSE and no value is returned. |
| FindAttributeAsLong (BSTR i_Name, long * o_pValue, VARIANT_BOOL * o_pFound); | Gets any arbitrary attribute as Long. The attribute must have been set as the given type or be specified as that type in the document schema. If the attribute is not in the element, Found is FALSE and no value is returned. |
| FindAttributeAsVARIANT (BSTR i_Name, VARIANT * o_pValue, VARIANT_BOOL * o_pFound); | Gets any arbitrary attribute as a variant value. If the attribute is not in the element, Found is FALSE and no value is returned. |
| FindContentElementByName (BSTR i_Name, IGrooveElement ** o_ppElement, VARIANT_BOOL * o_pFound); | Within the context of this element, find an element with the specified tag name. If the element is not found, Found is FALSE and no element reference is returned. |
| FindContentElementByNameAndAttribute (BSTR i_Name, BSTR i_AttributeName, BSTR i_AttributeValue, IGrooveElement ** o_ppElement, VARIANT_BOOL * o_pFound); | Within the context of this element, find an element with the specified tag name and attribute name with the specified attribute value. If the element is not found, Found is FALSE and no element reference is returned |
| FindParent (IGrooveElement ** o_ppParent, VARIANT_BOOL * o_pFound); | Gets an object's parent element. An element can have only a single parent and may only be referenced from a single content entry of a single element. If the element does not have a parent, Found is FALSE and no value is returned. |
| GetActuate (GrooveXLinkActuate * o_pActuate); | Returns the value of the Actuate parameter in this element's link attribute. |
| GetAttributeCount (long * o_pCount); | Returns the number of attributes an element has. |
| GetContentCount (long * o_pCount); | Returns the number of content and text entries in this element. |
| GetContentType (long i_Ordinal GrooveContentType * o_pType); | Returns the type of content at the specified ordinal position. |
| GetOrdinal (long * o_pOrdinal); | Gets the ordinal position within the parent's content of this element. |
| GetSerialize (GrooveXLinkSerialize * o_pSerialize); | Returns the value of the Serialize parameter in this element's link attribute. |
| GetShow (GrooveXLinkShow * o_pShow); | Returns the value of the Show parameter in this element's link attribute. |
| IncrementAttributeAsLong (BSTR i_Name, long * o_pOldValue); | Adds 1 to the value of a long integer type attribute. |
| InsertContent (long i_Ordinal, BSTR i_Text, GrooveContentType i_Type); | Inserts the text entry at the specified ordinal location |
| InsertContentElement (long i_Ordinal, IGrooveElement * i_pElement); | Inserts the element at the specified ordinal location |
| InsertContentProcessingInstruction (long i_Ordinal, BSTR i_Target, BSTR i_Text); | Inserts a Text processing instruction, with target Target, at the specified ordinal position. |
| IsLinkElement (VARIANT_BOOL * o_plsLink); | Determines whether or not the element contains XLink markup. |
| IsReferenced (VARIANT_BOOL * o_plsReferenced); | Returns TRUE if this element is referenced. |
| IsSame (IGrooveElement * i_pElement, VARIANT_BOOL * o_plsSame); | Returns TRUE if the specified element object is this element or equal to this element. |
| OpenAttribute (BSTR i_Name, BSTR *o_pValue); | Gets any arbitrary attribute as text. |

TABLE 15-continued

| Interface IGrooveElement : IDispatch | |
|---|---|
| OpenAttributeAsBinary (BSTR i__Name, IGrooveByteInputStream ** o__ppValue); | Gets any arbitrary attribute as Binary. The attribute must have been set as the given type or be specified as that type in the document schema. |
| OpenAttributeAsBinaryArray (BSTR i__Name, SAFEARRAY(BYTE) * o__ppValue); | Gets any arbitrary attribute as Binary and return the value in an array. The attribute must have been set as the given type or be specified as that type in the document schema. |
| OpenAttributeAsBinaryToStream (BSTR i__Name, IGrooveByteOutputStream * i__pStream); | Gets any arbitrary attribute as Binary and returns the value in a stream. The attribute must have been set as the given type or be specified as that type in the document schema. |
| OpenAttributeAsBool (BSTR i__Name, VARIANT_BOOL * o__pValue); | Gets any arbitrary attribute as Boolean. The attribute must have been set as the given type or be specified as that type in the document schema. |
| OpenAttributeAsDouble (BSTR i__Name, double * o__pValue); | Gets any arbitrary attribute as Double. The attribute must have been set as the given type or be specified as that type in the document schema. |
| OpenAttributeAsGrooveID (BSTR i__Name, double * o__pValue); | Gets any arbitrary attribute as a Groove identifier. The attribute must have been set as the given type or be specified as that type in the document schema. |
| OpenAttributeAsLong (BSTR i__Name, long * o__pValue); | Gets any arbitrary attribute as Long. The attribute must have been set as the given type or be specified as that type in the document schema. |
| OpenAttributeAsVARIANT (BSTR i__Name, VARIANT * o__pValue); | Gets any arbitrary attribute as a variant value. |
| OpenAttributeEnum (IGrooveStringStringEnum ** o__ppAttributes); | Enumerates all of the element's attributes as text. |
| OpenAttributeVariantEnum (IGrooveNameValueEnum ** o__ppEnum); | Enumerates all of the element's attributes as variant data types. |
| OpenBoundCode (IGrooveBoundCode ** o__ppBoundCode); | Returns an instance of the object bound to the element. |
| OpenContentComment (long i__Ordinal, BSTR * o__pComment); | Returns the text of the comment that is a contained in this element at the specified Ordinal position. |
| OpenContentElement (long i__Ordinal, IGrooveElement ** o__ppElement); | Returns the child element interface that is a contained in this element at the specified Ordinal position. |
| OpenContentElementByName (BSTR i__Name, IGrooveElement ** o__ppElement); | Within the context of this element, find an element with the specified tag name and return its interface. |
| OpenContentElementByNameAndAttribute (BSTR i__Name, BSTR i__AttributeName, BSTR i__AttributeValue, IGrooveElement ** o__ppElement); | Within the context of this element, find an element with the specified tag name and attribute name with the specified attribute value. |
| OpenContentElementEnum (IGrooveElementEnum ** o__ppElements); | Returns an enumeration of all child content elements (non-recursively). |
| OpenContentElementEnumByName (BSTR i__Name, IGrooveElementEnum ** o__ppElements); | Returns an enumeration of all child content elements (non-recursively). Only elements with the given name will be returned. |
| OpenContentElementEnumByNameAnd Attribute (BSTR i__Name, BSTR i__AttributeName, BSTR i__AttributeValue, IGrooveElementEnum ** o__ppElements); | Returns an enumeration of all content elements within the scope of this element that have the specified tag name and attribute name with the specified attribute value. |
| OpenContentProcessingInstruction (long i__Ordinal, BSTR * o__pTarget, BSTR * o__pText); | Returns the XML processing instruction at the specified ordinal position. |
| OpenContentProcessingInstructionTarget (long i__Ordinal, BSTR * o__pTarget); | Returns the target of the XML processing instruction at the specified ordinal position. |
| OpenContentProcessingInstructionText (long i__Ordinal, BSTR * o__pText); | Returns the PI text of the XML processing instruction at the specified ordinal position. |
| OpenContentText (long i__Ordinal, BSTR * o__pText); | Returns the context text at the specified ordinal position. |
| OpenContentTextEnum (IGrooveBSTREnum ** o__ppText); | Enumerates the text entries (non-recursively). |

TABLE 15-continued

| Interface IGrooveElement : IDispatch | |
|---|---|
| OpenElementQueue (IGrooveElementQueue ** o__ppQueue); | Create an element queue on the element. The element queue does not affect the element's structure. |
| OpenElementReferenceQueue (IGrooveElementReferenceQueue ** o__ppQueue); | Returns the interface to reference queue object. |
| OpenHRef (BSTR * o__pHref); | Returns the value of the HREF parameter in this element's link attribute. |
| OpenLinkAttributes (BSTR * o__pHref, BSTR * o__pTitle, BSTR * o__pRole, GrooveXLinkShow * o__pShow, GrooveXLinkActuate * o__pActuate, GrooveXLinkSerialize * o__pSerialize); | Retrieves all the standard link elements. Note : not all the attributes are mandatory |
| OpenLinkedBinaryDocument (VARIANT_BOOL i__SingleProcess, IUnknown * i__pSecurityContext, IGrooveBinaryDocument ** o__ppDocument); | Returns the interface to the binary document that is referenced in the HREF parameter in this element's link attribute. |
| OpenLinkedXMLDocument (VARIANT_BOOL i__SingleProcess, IUnknown * i__pSecurityContext, IGrooveXMLDocument ** o__ppDocument); | Returns the interface to the XML document that is referenced in the HREF parameter in this element's link attribute. |
| OpenMultiReaderElementQueueReader (IGrooveMultiReaderElementQueueReader ** o__ppQueue); | Create an element multi-reader queue on the element and add a reader. This could change the structure of the element. |
| OpenMultiReaderElementQueueWriter (GrooveMultiReaderQueueOptions i__Options, IGrooveMultiReaderElementQueueWriter ** o__ppQueue); | Create an element multi-writer queue on the element and add a writer. This could change the structure of the element. |
| OpenMultiReaderElementReferenceQueueReader (IGrooveMultiReaderElementQueueReader ** o__ppQueue); | Returns the interface to the multi-reader element reference queue reader object. |
| OpenMultiReaderElementReferenceQueueWriter (GrooveMultiReaderQueueOptions i__Options, IGrooveMultiReaderElementQueueWriter ** o__ppQueue); | Returns the interface to the multi-reader element reference queue writer object. |
| OpenName (BSTR * o__pName); | Returns the element's tag name. |
| OpenParent (IGrooveElement ** o__ppParent); | Gets an object's parent element. An element can have only a single parent and may only be referenced from a single content entry of a single element. |
| OpenReadOnlyElement (VARIANT_BOOL i__AllowOpenParent, IGrooveReadOnlyElement ** o__ppReadOnlyElement); | Return the read-only element interface to this element. |
| OpenReference (IGrooveElementReference ** o__ppElementReference); | Returns the element reference interface to this element. |
| OpenRole (BSTR * o__pRole); | Returns the value of the Role parameter in this element's link attribute. |
| OpenTitle (BSTR * o__pTitle); | Returns the value of the Title parameter in this element's link attribute. |
| OpenURI (BSTR * o__pName); | Returns the URI to this element. |
| OpenXMLDocument (IGrooveXMLDocument ** o__ppDocument); | Returns the interface pointer to the XML document containing this element. |
| Serialize (GrooveSerializeType i__Type, enum GrooveCharEncoding i__Encoding, GrooveSerializeOptions i__Options, IGrooveByteInputStream ** o__ppStream); | Serializes the element to a stream with the specified encoding and options. |
| SerializeReturnAdditionalLinkedDocuments (GrooveSerializeType i__Type, enum GrooveCharEncoding i__Encoding, GrooveSerializeOptions i__Options, IGrooveDocumentEnum ** o__ppAdditionalLinkedDocuments, IGrooveByteInputStream ** o__ppStream); | Serializes the element to a stream with the specified encoding and options. Returns an enumeration of interfaces to documents referenced by links in this element and all descendents. |

TABLE 15-continued

| Interface IGrooveElement : IDispatch | |
|---|---|
| SerializeToStream (IGrooveByteOutputStream * i_pStream, GrooveSerializeType i_Type, enum GrooveCharEncoding i_Encoding, GrooveSerializeOptions i_Options); | Serializes the element to a stream with the specified encoding and options. |
| SerializeToStreamReturnAdditionalLinked Documents (IGrooveByteOutputStream * i_pStream, GrooveSerializeType i_Type, enum GrooveCharEncoding i_Encoding, GrooveSerializeOptions i_Options, IGrooveDocumentEnum ** o_ppAdditionalLinkedDocuments); | Serializes the element to a stream with the specified encoding and options. Returns an enumeration of interfaces to documents referenced by links in this element and all descendents. |
| SetAttribute (BSTR i_Name, BSTR i_Value); | Sets any arbitrary attribute as text. |
| SetAttributeAsBinary (BSTR i_Name, IGrooveByteInputStream * i_pValue); | Sets any arbitrary attribute as Binary. The attribute must have been set as the given type or be specified as that type in the document schema. |
| SetAttributeAsBinaryArray (BSTR i_Name, SAFEARRAY(BYTE) * i_pValue); | Sets any arbitrary attribute as Binary and returns the value in an array. The attribute must have been set as the given type or be specified as that type in the document schema. |
| SetAttributeAsBool (BSTR i_Name, VARIANT_BOOL i_Value); | Sets any arbitrary attribute as Boolean. The attribute must have been set as the given type or be specified as that type in the document schema. |
| SetAttributeAsDouble (BSTR i_Name, double i_Value); | Sets any arbitrary attribute as Double. The attribute must have been set as the given type or be specified as that type in the document schema. |
| SetAttributeAsGrooveID (BSTR i_Name, double i_pValue); | Sets any arbitrary attribute as a Groove identifier. The attribute must have been set as the given type or be specified as that type in the document schema. |
| SetAttributeAsLong (BSTR i_Name, long i_Value); | Sets any arbitrary attribute as Long. The attribute must have been set as the given type or be specified as that type in the document schema. |
| SetAttributeAsVARIANT (BSTR i_Name, VARIANT * i_pValue); | Sets any arbitrary attribute using a Variant, which may be any variant type. |
| SetContent (long i_Ordinal, BSTR i_Text, GrooveContentType i_Type); | Sets the content as the type's ordinal position to the specified text. Note that content of different types have independent ordinal positions. |
| SetContentElement (long i_Ordinal, IGrooveElement * i_pElement); | Set the content element at the specified ordinal position. |
| SetContentProcessingInstruction (long i_Ordinal, BSTR i_Target, BSTR i_Text); | Set the content processing instruction at the specified ordinal position. |
| SetContentTextEnum (IGrooveBSTREnum * i_pEnum); | Creates text entries, separated by <BR> elements, for each text string in the enumerator. |
| SetLinkAttributes (BSTR i_Href, BSTR i_Title, BSTR i_Role, GrooveXLinkShow i_Show, GrooveXLinkActuate i_Actuate, GrooveXLinkSerialize i_Serialize); | Sets the link attributes needed to make the element a link element, including the 'xml:link' attribute, which is implicitly set to 'simple'. |
| SetName (BSTR i_Name); | Sets the name of the element. |
| SetTempAttribute (BSTR i_Name, BSTR i_Value); | Sets an attribute with a temporary value, which will not be committed in a transaction. |

Table 16 illustrates the methods for an interface 1212 (IGrooveReadOnlyElement) for a client of a storage manager that needs to manipulate read-only elements within XML documents. Read-only elements are a sub-class of elements, that is, all of the methods for IGrooveElement also apply to IGrooveReadOnlyElement.

TABLE 16

| interface IGrooveReadOnlyElement : IGrooveElement | |
| --- | --- |
| OpenReadOnlyParent (IGrooveReadOnlyElement ** o__ppParent); | Returns a read-only element interface to the parent of this element. |
| OpenContentReadOnlyElement (long i__Ordinal, IGrooveReadOnlyElement ** o__ppElement); | Returns a read-only element interface to the content element at the specified Ordinal position. |
| OpenContentReadOnlyElementByName (BSTR i__Name, IGrooveReadOnlyElement ** o__ppElement); | Within the context of this element, find an element with the specified tag name and return its read-only interface. |
| FindContentReadOnlyElementByName (BSTR i__Name, IGrooveReadOnlyElement ** o__ppElement, VARIANT__BOOL * o__pFound); | Within the context of this element, find an element with the specified tag name and return its read-only interface. If the element is not found, Found is FALSE and no element reference is returned. |
| OpenContentReadOnlyElementEnum (IGrooveReadOnlyElementEnum ** o__ppElements); | Returns an enumeration of all child content elements read-only interfaces (non-recursively). |
| OpenContentReadOnlyElementEnumByName (BSTR i__Name, IGrooveReadOnlyElementEnum ** o__ppElements); | Returns an enumeration of all child content elements read-only interfaces (non-recursively). Only elements with the given name will be returned. |

Table 17 illustrates an interface 1214 (IGrooveElementReference) for a client of a storage manager that needs to manipulate element references within XML documents. The storage manager element reference interface includes the following methods:

TABLE 17

| Interface IGrooveElementReference : IDispatch | |
| --- | --- |
| OpenElement (IgrooveReadOnlyElement ** o__ppElement); | Returns a read-only element interface to the referenced element. |

An interface 1216 (IGrooveElementUtilBase) for use within the storage manager's other interfaces is shown in Table 18. The IGrooveElementUtilBase is not an interface for commonly-used objects, but is intended to serve as the base class for other sub-classes (shown in FIG. 13) that do have commonly-used objects. All of the "util" interfaces are associated with an element. The storage manager element util base interface includes the following methods:

TABLE 18

| Interface IGrooveElementUtilBase : IDispatch | |
| --- | --- |
| OpenDocument (IgrooveXMLDocument ** o__ppDocument); | Returns the interface of the containing XML document. |
| OpenElement (IGrooveElement ** o__ppElement); | Returns the element's interface. |

Table 19 illustrates an interface 1218 (IGrooveBoundCode) for a client of a storage manager that needs to handle executable code associated with elements within XML documents. The storage manager bound code interface includes the following methods:

TABLE 19

| interface IGrooveBoundCode : IDispatch | |
| --- | --- |
| SetElement (IGrooveElement * i__pElement); | Sets the element interface pointer associated with this element tag. |
| OpenElement (IGrooveElement ** o__ppElement); | Retrieves the element interface pointer associated with this element tag. |

FIG. 13 illustrates interfaces which are sub-classes of the IGrooveElementUtilBase base class 1300, discussed above. Table 20 illustrates an interface 1302 (IGrooveElementQueue) for a client of a storage manager that needs to manipulate queues on elements within XML documents. Element queues are a sub-class of the "util" base class, that is, all of the methods for IGrooveElementUtilBase also apply to IGrooveElementQueue. The storage manager element queue interface includes the following methods:

TABLE 20

| interface IGrooveElementQueue : IGrooveElementUtilBase | |
| --- | --- |
| Enqueue (IGrooveElement * i__pElement); | Enqueues the element. Note that the element must already be contained in the queue's document. |
| Dequeue (long i__TimeoutMilliseconds, IGrooveElement ** o__ppElement); | Dequeues the next available element in the queue. Returns only when an element is available or after the timeout period. The returned IGrooveElement pointer will be NULL if the timeout period expires. |
| DequeueEnum (long i__TimeoutMilliseconds, IGrooveElementEnum ** o__ppElements); | Dequeues all available elements in the queue. Returns only when an element is available or after the timeout period. The returned IGrooveElement pointer will be NULL if the timeout period expires. |
| OpenEvent (IGrooveEvent ** o__ppEvent); | Returns an event that can be used to 'Wait' for an element to be enqueued |

Table 21 illustrates an interface 1306 (IGrooveElementReferenceQueue) for a client of a storage manager that needs to manipulate queues on element references within XML documents. Element reference queues are a sub-class of the "util" base class, that is, all of the methods for IGrooveElementUtilBase also apply to IGrooveElementReferenceQueue. The storage manager element reference queue interface includes the following methods:

TABLE 21

| interface IGrooveElementReferenceQueue : IGrooveElementUtilBase | |
| --- | --- |
| Enqueue (IGrooveElement * i__pElement); | Enqueues the element. Note that the element must already be contained in the queue's document. |
| EnqueueReference (IGrooveElement * i__pElement); | Enqueues a reference to the element. Note that the element must already be contained in the queue's document. |
| Dequeue (long i__TimeoutMilliseconds, IGrooveElementReference ** o__ppElementReference); | Dequeues the next available element in the queue. Returns only when an element is available or after the timeout period. The returned IGrooveElementReference pointer will be NULL if the timeout period expires. |
| DequeueEnum (long i__TimeoutMilliseconds, IGrooveElementReferenceEnum ** o__ppElementReferences); | Dequeues all available elements in the queue. Returns only when an element is available or after the timeout period. The returned IGrooveElementReferenceEnum pointer will be NULL if the timeout period expires. |
| OpenEvent (IGrooveEvent ** o__ppEvent); | Returns an event that can be used to 'Wait' for an element to be enqueued |

Table 22 illustrates an interface 1310 (IGrooveMultiReaderElementQueueReader) for a client of a storage manager that needs to remove elements from multi-reader queues on elements within XML documents. Multi-reader element queues are a sub-class of the "util" base class, that is, all of the methods for IGrooveElementUtilBase also apply to IGrooveMultiReaderElementQueueReader. The storage manager multi-reader element queue reader interface includes the following methods:

TABLE 22

| interface IGrooveMultiReaderElementQueueReader : IGrooveElementUtilBase | |
| --- | --- |
| Dequeue (long i__TimeoutMilliseconds, IGrooveElement ** o__ppElement); | Dequeues the next available element in the queue. Returns only when an element is available or after the timeout period. The returned IGrooveElement pointer will be NULL if the timeout period expires. |

TABLE 22-continued

| interface IGrooveMultiReaderElementQueueReader : IGrooveElementUtilBase | |
|---|---|
| DequeueEnum (long i_TimeoutMilliseconds, IGrooveElementEnum ** o_ppElements); | Dequeues all available elements in the queue. Returns only when an element is available or after the timeout period. The returned IGrooveElement pointer will be NULL if the timeout period expires. |
| OpenEvent (IGrooveEvent ** o_ppEvent); | Returns an event that can be used to 'Wait' for an element to be enqueued |

Table 23 illustrates an interface 1314 (IGrooveMultiReaderElementQueueWriter) for a client of a storage manager that needs to add elements to multi-reader queues on elements within XML documents. Multi-reader element queues are a sub-class of the "util" base class, that is, all of the methods for IGrooveElementUtilBase also apply to IGrooveMultiReaderElementQueueWriter. The storage manager multi-reader element queue writer interface includes the following methods:

TABLE 23

| interface IGrooveMultiReaderElementQueueWriter : IGrooveElementUtilBase | |
|---|---|
| Enqueue (IGrooveElement *i_pElement, long * o_pNumEnqueued); | Enqueues the element and returns the number already enqueued. Note that the element must already be contained in the queue's document. |

TABLE 23-continued

| interface IGrooveMultiReaderElementQueueWriter : IGrooveElementUtilBase | |
|---|---|
| GetNumReaders (long * o_pNumReaders); | Get the number of readers on the queue. |

Table 24 illustrates an interface 1318 (IGrooveMultiReaderElementReferenceQueueWriter) for a client of a storage manager that needs to add element references to multi-reader queues on elements within XML documents. Multi-reader element reference queues are a sub-class of the "util" base class, that is, all of the methods for IGrooveElementUtilBase also apply to IGrooveMultiReaderElementReferenceQueueWriter. The storage manager multi-reader element reference queue writer interface includes the following methods:

TABLE 24

| interface IGrooveMultiReaderElementReferenceQueueWriter : IGrooveElementUtilBase | |
|---|---|
| Enqueue (IGrooveElement * i_pElement, long * o_pNumEnqueued); | Enqueues the element and returns the number already enqueued. Note that the element must already be contained in the queue's document. |
| EnqueueReference (IGrooveElement * i_pElement, long * o_pNumEnqueued); | Enqueues the element reference and returns the number already enqueued. Note that the element must already be contained in the queue's document. |
| GetNumReaders (long * o_pNumReaders); | Get the number of readers on the queue. |

Table 25 illustrates an interface 1316 (IGrooveMultiReaderElementReferenceQueueReader) for a client of a storage manager that needs to remove element references from multi-reader queues on elements within XML documents. Multi-reader element reference queues are a sub-class of the "util" base class, that is, all of the methods for IGrooveElementUtilBase also apply to IGrooveMultiReaderElementReferenceQueueReader. The storage manager multi-reader element reference queue reader interface includes the following methods:

TABLE 25

| interface IGrooveMultiReaderElementReferenceQueueReader : IGrooveElementUtilBase | |
|---|---|
| Dequeue (long i_TimeoutMilliseconds, IGrooveElementReference ** o_ppElementReference); | Dequeues the next available element reference in the queue. Returns only when an element is available or after the timeout period. The returned IGrooveElementReference pointer will be NULL if the timeout period expires. |

TABLE 25-continued

| interface IGrooveMultiReaderElementReferenceQueueReader : IGrooveElementUtilBase | |
|---|---|
| DequeueEnum (long i_TimeoutMilliseconds, IGrooveElementReferenceEnum ** o_ppElementReferences); | Dequeues all available element references in the queue. Returns only when an element is available or after the timeout period. The returned IGrooveElementReference pointer will be NULL if the timeout period expires. |
| OpenEvent (IGrooveEvent ** o_ppEvent); | Returns an event that can be used to 'Wait' for an element to be enqueued |

Table 26 illustrates an interface 1304 (IGrooveRPCClient) for a client of a storage manager that needs to perform remote procedure calls (RPCS) on elements within XML documents. RPC clients are a sub-class of the "util" base class, that is, all of the methods for IGrooveElementUtilBase also apply to IGrooveRPCClient. The storage manager RPC client interface includes the following methods:

TABLE 26

| interface IGrooveElementRPCClient : IGrooveElementUtilBase | |
|---|---|
| DoCall (IGrooveElement * i_pInput, IGrooveElement ** o_ppOutput); | Make a RPC, using the Input element as the input parameters and receiving output parameters in the Output element. |
| SendCall (IGrooveElement * i_pInput); | Make an asynchronous RPC, using the Input element as the input parameters. |
| OpenResponseQueue (IGrooveElementQueue ** o_ppQueue); | Returns the queue where responses are received. |

An interface 1308 (IGrooveRPCServerThread) for a client of a storage manager that needs to handle remote procedure calls (RPCs) on elements within XML documents is shown in Table 27. RPC server threads are a sub-class of the "util" base class, that is, all of the methods for IGrooveElementUtilBase also apply to IGrooveRPCServerThread. The storage manager RPC server callback interface has no methods of its own, only those inherited from IGrooveElementUtilBase. It is provided as a distinct interface for type checking.

TABLE 27

| interface IGrooveElementRPCServerThread : IGrooveElementUtilBase |
|---|
| (none) |

Table 28 illustrates an interface 1312 (IGrooveRPCServer) for a client of a storage manager that needs to handle remote procedure calls (RPCs) on elements within XML documents. RPC servers are a sub-class of the "util" base class, that is, all of the methods for IGrooveElementUtilBase also apply to IGrooveRPCServer. The storage manager RPC server interface includes the following methods:

TABLE 28

| interface IGrooveElementRPCServer : IGrooveElementUtilBase | |
|---|---|
| OpenCallQueue (IGrooveElementQueue ** o_ppQueue); | Returns the queue where calls are received. |
| SendResponse (IGrooveElement * i_pInput, IGrooveElement * i_pOutput, VARIANT_BOOL * o_bResult); | Sends a response to the caller, returning output parameters in the Output element. |

The following tables illustrate allowed values for the enumerated data types listed in the above interfaces. In particular, Table 29, illustrates allowed values for the GrooveSerializeType enumerated data type.

TABLE 29

| GrooveSerializeType | |
|---|---|
| GrooveSerializeAuto | On input, Groove will determine the correct format by examining the first few bytes of the input stream. On output, Groove will select a format based on the kind of document or element data. |
| GrooveSerializeMIME | Format is MHTML, as defined in RFC 2557. |
| GrooveSerializeXML | Format is XML. Note that binary documents are not supported with this format, but it may be a body type in MHTML. |
| GrooveSerializeWBXML | Format is WBXML. Note that binary documents are not supported with this format, but it may be a body type in MHTML. |

Table 30 illustrates the allowed values for the GrooveSerializeOptions enumerated data type.

TABLE 30

| GrooveSerializeOptions | |
|---|---|
| GrooveSerializeDefault | Use default serialization options. |
| GrooveSerializeWithFormatting | Indent, with blanks, each level of child content elements beneath the parent element. |
| GrooveSerializeSortedAttrs | Output the attributes for each element in order of ascending attribute name. |
| GrooveSerializeNoFragmentWrapper | Output without the fragment wrapper for document fragments (elements). |

TABLE 30-continued

| GrooveSerializeOptions | |
|---|---|
| GrooveSerializeNoNamespaceContraction | Output with fully expanded element and attribute names. |
| GrooveSerializeNoProlog | Output without the XML document prolog. |
| GrooveSerializeNoLinks | Output without linked documents. |
| GrooveSerializeNotMinimum | Don't spend as much local processor time as needed to ensure the resulting output is the minimum size. |

Table 31 illustrates the allowed values for the GrooveParseOptions enumerated data type.

TABLE 31

| GrooveParseOptions | |
|---|---|
| GrooveParseDefault | Use default parse options. |
| GrooveParseStripContentWhitespace | Remove all extraneous whitespace from element content. |
| GrooveParseNoFragment | Parse a fragment that doesn't have a fragment wrapper. |
| GrooveParseNoNamespaceExpansion | Parse the document, but don't expand namespaces to their fully qualified form. |
| GrooveParseNoLinks | Parse a document and skip the links. |

Table 32 illustrates the allowed values for the GrooveContentType enumerated data type.

TABLE 32

| GrooveContentType | |
|---|---|
| GrooveContentElement | Content is a child element. |
| GrooveContentText | Content is body text. |
| GrooveContentCDATASection | Content is a CDATA section. |
| GrooveContentProcessingInstruction | Content is a processing instruction. |
| GrooveContentComment | Content is a comment. |

Table 33 illustrates the allowed values for the GrooveXLinkShow enumerated data type.

TABLE 33

| GrooveXLinkShow | |
|---|---|
| GrooveXLinkShowNew | New. |
| GrooveXLinkShowParsed | Parsed. |
| GrooveXLinkShowReplace | Replace. |

Table 34 illustrates the allowed values for the GrooveXLinkActuate enumerated data type:

TABLE 34

| GrooveXLinkActuate | |
|---|---|
| GrooveXLinkActuateUser | User. |
| GrooveXLinkActuateAuto | Auto. |

Table 35 illustrates the allowed values for the GrooveXLinkSerialize enumerated data type.

TABLE 35

| GrooveXLinkSerialize | |
|---|---|
| GrooveXLinkSerializeByValue | By value. |
| GrooveXLinkSerializeByReference | By reference. |
| GrooveXLinkSerializeIgnore | Ignore. |

Table 36 illustrates the allowed values for the GrooveMultiReaderQueueOptions enumerated data type.

TABLE 36

| GrooveMultiReaderQueueOptions | |
|---|---|
| GrooveMRQDefault | Use default options. |
| GrooveMRQAllReceive | All readers receive each event notification. |
| GrooveMRQEnqueueIfNoReaders | Enqueue even if no reader is currently queued to receive the element. |

The fundamental data model of the storage manager is XML. XML is a semi-structured, hierarchical, hyper-linked data model. Many real world problems are not well represented with such complex structures and are better represented in tabular form. For example, spreadsheets and relational databases provide simple, tabular interfaces. In accordance with one aspect of the invention, in order to simplify the representation, XML structures are mapped to a tabular display, generally called a "waffle". The waffle represents a collection of data. This mapping is performed by the collection manager, a component of the storage manager.

Collections are defined by a collection descriptor, which is an XML document type description. Like a document schema, the collection descriptor is a special kind of document that is stored apart from the collection data itself. There are many sources of collection data, but the primary source of collection data is a software routine called a record set engine. Driven by user commands, the record set engine propagates a set of updates for a collection to the collection manager. Based on those updates, the collection manager updates index structures and may notify waffle users via the notification system. When a waffle user needs updated or new collection data, the waffle user will call the collection manager to return a new result array containing the updated data. The waffle user may also navigate within the collection using cursors.

The following list shows the XML DTD contents for a collection descriptor document:

```
<!ELEMENT Collection ANY>
<!ATTLIST Collection
      Name        CDATA           #REQUIRED
      Start       (record|index)  "record"    #REQUIRED
      Version     CDATA           #REQUIRED
      Location    CDATA           #IMPLIED
>
<!ELEMENT Level (Column|Sorting|Level)*>
<!ATTLIST Level
      Mapping     (Flatten|Direct)
      Links       (Embed|Traverse) "Traverse"
>
<!ELEMENT Column EMPTY>
<!ATTLIST Column
      Source            CDATA       #REQUIRED
      Output            CDATA       #REQUIRED
      MultiValue        (OnlyFirst|MultiLine|Concatenate) "OnlyFirst"
      MultiValueSeparator   CDATA   #IMPLIED ","
>
<!ELEMENT Sorting SortDescription+>
<!ELEMENT SortDescription Group?|SortColumn+|Interval?>
<!ATTLIST SortDescription
      Name        CDATA       #REQUIRED
>
<!ELEMENT SortColumn EMPTY>
<!ATTLIST SortColumn
      Source        CDATA       #REQUIRED
      Order         (Ascending|Descending)  #REQUIRED
      DataType      CDATA       #REQUIRED
      Strength      (Primary|Secondary|Tertiary|Identical) "Identical"
      Decomposition (None|Canonical|Full) "None"
>
<!ELEMENT Group Group?|GroupColumn+>
<!ATTLIST Group
      Grouping (Unique|Units) #REQUIRED
      GroupUnits (Years|Months|Days|Hours)
      AtGroupBreak (None|Count|Total) "None"
      Order (Ascending|Descending)    #REQUIRED
      Strength      (Primary|Secondary|Tertiary|Identical) "Identical"
      Decomposition (None|Canonical|Full) "None"
>
<!ELEMENT GroupColumn EMPTY>
<!ATTLIST GroupColumn
      Source        CDATA       #REQUIRED
>
<!ELEMENT Interval EMPTY>
<!ATTLIST Interval
      Start         CDATA       #REQUIRED
      End           CDATA       #REQUIRED
>
```

Every Collection has a name that is used to reference the collection. The Start attribute specifies how to find the "root" of the collection. A collection with a record root is just a set of records, whereas a collection that starts with an index is navigated through the index and then the set of records. An index may be a concordance or full-text. The optional Location attribute is a relative URL that identifies where in the root to actually begin.

A Level defines the contents of part of the output hierarchy. A level consists of the columns in the level, the ordering or grouping of records in the level, and definitions of sub-levels. A level is associated with records in the source record stream through the Mapping attribute. If the mapping is Direct, a level represents a single source record type. If the mapping is Flatten, the level contains a source record type and all descendants of that record. The Flatten mapping may only be specified on the only or lowest level in the collection. The Links attribute specifies how records with link attributes should handled. If links are Traversed, the record will be output as a distinct level. If links are Embedded, the child record of the source record will appear as though it is part of the source record.

A Column defines the mapping between a source field and the output array column. The Source attribute is a XSLT path expression in the source records. The Result attribute is a name of the field in the result array. The MultiValue and MultiValueSeparator attributes define how multi-valued source values are returned in the result.

Every collection must have at least one defined order. The order can be sorted collation or multi-level grouping with aggregate functions.

The SortColumn element defines the collation characteristics within a SortDescription. The Source attribute defines the name of the output column to be sorted. The Order must be either Ascending or Descending. The Strength and Decomposition values are input parameters that have the same meaning as defined in Unicode.

The two kinds of grouping are by unique values and by units. When a collection is grouped by unique values, all records with the same GroupColumn values will be together in the same group—breaks between groups will occur at the change of GroupColumn values. When a collection is grouped by units, all records with the same GroupColumn values, resolved to the value of GroupUnits, will be together in the same group. For example, if GroupUnits is "Days", all records for a given day will be in the same group. If AtGroupBreak is specified, a synthetic row will be returned that contains the result of the aggregate function at each value or unit break value.

The GroupColumn identifies the result column to be grouped.

The Interval identifies the two fields in each record that define a range. The datatypes of the Start and End columns must be either numeric or datetime.

The following example shows a collection descriptor document for a simple document discussion record view with six collation orders:

```
<Collection Name="Main" Start="Record" Version="0,1,0,0">
    <Level Mapping="Flatten">
        <Column Source="Title" Output="Title"/>
        <Column Source="_Modified" Output="_Modified"/>
        <Column Source="_CreatedBy" Output="_CreatedBy"/>
        <Sorting>
            <SortDescription Name="ByAscModified">
                <SortColumn Source="_Modified" Order="Ascending"
                    DataType="DateTime"/>
            </SortDescription>
            <SortDescription Name="ByDescModified">
                <SortColumn Source="_Modified"
                    Order="Descending" DataType="DateTime"/>
            </SortDescription>
            <SortDescription Name="ByAscAuthor">
                <SortColumn Source="_CreatedBy"
                    Order="Ascending" DataType="String"/>
            </SortDescription>
            <SortDescription Name="ByDescAuthor">
                <SortColumn Source="_CreatedBy"
                    Order="Descending" DataType="String"/>
            </SortDescription>
            <SortDescription Name="ByAscTitle">
                <SortColumn Source="Title" Order="Ascending"
                    DataType="String"/>
```

-continued

```
    </SortDescription>
    <SortDescription Name="ByOrdinal">
        <SortColumn Source="" Order="Ordinal"
            DataType="Long"/>
    </SortDescription>
  </Sorting>
 </Level>
</Collection>
```

The following example shows a collection descriptor for a calendar view. Note the similarity to the prior example, but with a small change to the sort description, the collection is ordered by ranges of date intervals.

```
<Collection Name="Main" Start="Record" Version="0,1,0,0">
  <Level Mapping="Flatten">
    <Column Source="from-attributes(Subject)"
        Output="Subject"/>
    <Column Source="from-attributes(Start)"
        Output="Start"/>
    <Column Source="from-attributes(End)"
        Output="End"/>
    <Column Source="from-attributes(RecurrenceEnd)"
        Output="RecurrenceEnd"/>
    <Column Source="from-attributes(IsAllDay)"
        Output="IsAllDay"/>
    <Column Source="from-attributes(IsRecurrent)"
        Output="IsRecurrent"/>
    <Sorting>
      <SortDescription Name="DateRanges">
        <Interval Start="Start" End="End"/>
      </SortDescription>
    </Sorting>
  </Level>
</Collection>
```

Figure 14:
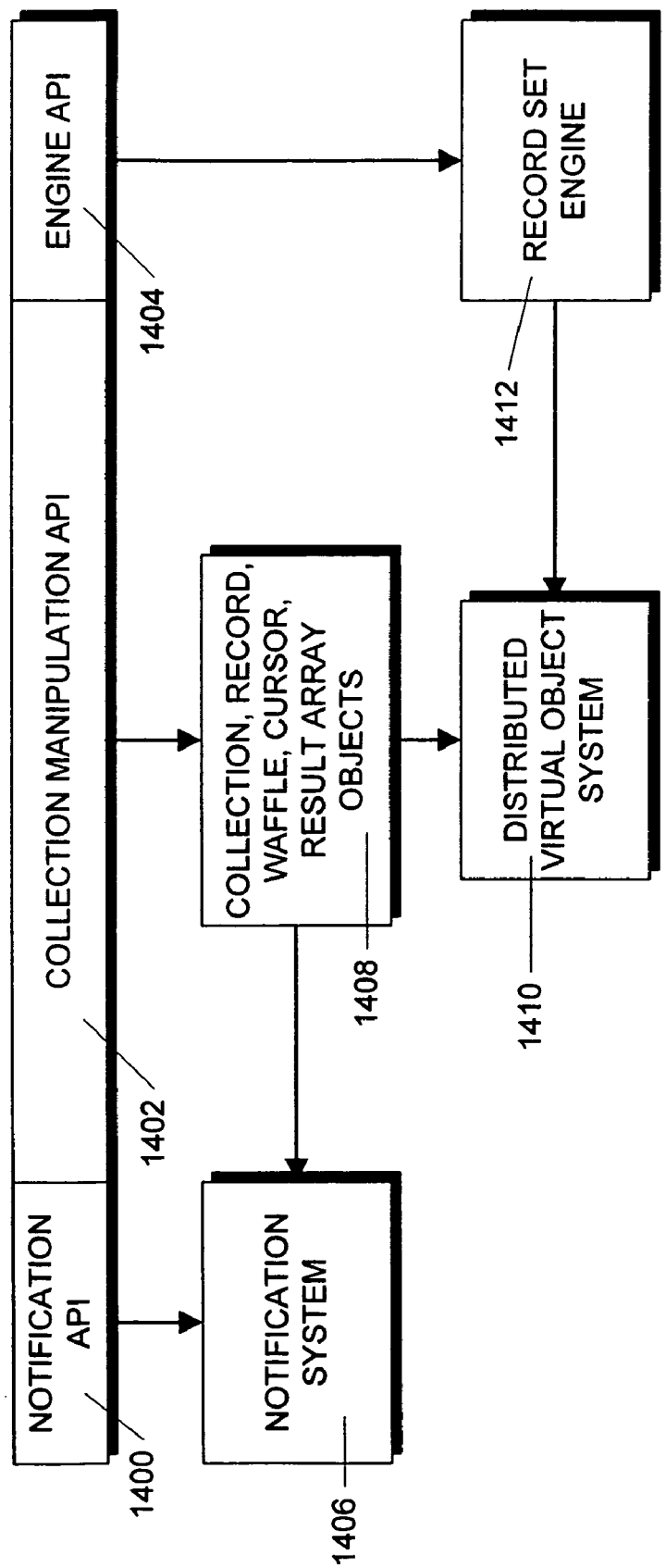
FIG. 14 is an illustration that shows the major control paths from the collection manager APIs through the major internal parts of the collection and storage managers.

As is the basic storage manager, the collection manager is implemented in an object-oriented environment. Accordingly, both the collection manager itself and all of the collection components including collections, waffles, cursors, result arrays and the record set engine are implemented as objects. These objects, their interface, the underlying structure and the API used to interface with the collection manager are illustrated in FIG. 14. The API is described in more detail in connection with FIG. 15. Referring to FIG. 14, the collection manager provides shared access to collections, via the collection manipulation API 1402, but, in order to enable a full programming model for client applications, additional communication and synchronization operations are provided, within the context of a collection. For example, a user can control a record set engine 1412 by means of the engine API 1404. Under control of commands in the engine API 1404, the record set engine 1412 propagates a set of updates for a collection to the distributed virtual object system 1410 that is discussed above. Based on those updates, the distributed virtual object system 1410 updates index and other structures.

Other client components may need to be aware of changes within components, such as waffles, managed by the collection manager. Accordingly, the collection manager provides an interface 1400 to an interest-based notification system 1406 for those client components. The notification system 1406 provides notifications to client component listeners who have registered an interest when values within objects 1408 that represent a collection change;

Collection data is represented by a set of objects including collection objects, record objects, waffle objects, cursor objects and result array objects 1408. The objects can be directly manipulated by means of the collection manipulation API 1402. The collection related objects 1408 are actually implemented by the distributed virtual object system 1410 that was discussed in detail above.

FIG. 15 and the following tables comprise a description of the interfaces for each of the objects used to implement a preferred embodiment of the inventive collection manager. As with the storage manager implementation, these objects are designed in accordance with the Common Object Model (COM), but could also be implemented using other styles of interface and object model.

Table 37 illustrates an interface 1500 (IGrooveCollectionManager) for a collection manager that encapsulates the basic framework for the major operations performed on a collection. The collection manager interface includes the following methods:

TABLE 37

| Interface IGrooveCollectionManager : IGrooveDispatch | |
|---|---|
| CreateCollection(IGrooveElement *i_pCollectionDescriptor, BSTR i_CollectionURL, BSTR i_EngineID, IGrooveCollection **o_ppCollection); | Creates a new collection object. The CollectionDescriptor should contain a collection descriptor in XML according to the GrooveCollection XML DTD. |
| DeleteCollection(IGrooveXMLDocument *i_pSourceDocument, BSTR i_CollectionURL); | Deletes the specified collection from the SourceDocument. |
| OpenCollection(IGrooveElement *i_pCollectionDescriptor, BSTR i_CollectionURL, BSTR i_EngineID, IGrooveCollection **o_ppCollection); | Opens an existing collection object. |
| OpenCollectionEnum(IGrooveXMLDocument * i_pSourceDocument, IGrooveBSTREnum **o_ppCollectionNames); | Return an enumeration of all collections within a document. |
| ParseCollectionDescriptor(IGrooveElement * i_pCollectionElement, void * m_Levels); | Creates a collection document according to the specified collection descriptor. |
| UpdateCollection(void *i_Updates, BSTR i_EngineID, IGrooveElement ** o_ppUpdateContext); | Perform the requested sequence of operations (of kind GrooveCollectionUpdateOp) on the collection for EngineID. |

Table 38 illustrates an interface 1502 (IGrooveCollection) for a collection that encapsulates the basic framework for the major operations performed on a collection. The collection interface includes the following methods:

TABLE 38

| Interface IGrooveCollection : IGrooveDispatch | |
|---|---|
| AdviseListeners(IGrooveElement *i__UpdateContext); | Notifies subscribing listeners of changes to this element. |
| CloseWaffle(IGrooveWaffle *i__pWaffle); | Removes an IGrooveWaffle instance from the list of the collection's listeners. |
| Delete(void); | Deletes the collection from the database. |
| DisableListeners (void); | Disables event notifications for all subscribing listeners. |
| EnableListeners (void); | Enables event notifications for all subscribing listeners. Event notifications are enabled by default, so this is only necessary if DisableListeners was previously called. |
| Find(BSTR i__pQuery, IGrooveCollection ** o__ppQueryResult); | Using the specified XSLT query expression, evaluate it on the collection and return a new collection as the result.<br>XSLT locators have the form:<br>AxisIdentifier(Node Test Predicate)<br>  where AxisIdentifier is one of:<br>    from-ancestors<br>    from-ancestors-or-self<br>    from-attributes<br>    from-children<br>    from-descendants<br>    from-descendants-or-self<br>    from-following<br>    from-following-siblings<br>    from-parent<br>    from-preceding<br>    from-preceding-siblings<br>    from-self<br>    from-source-link<br>  NodeTest is of the form QName and tests whether the<br>    node is an element or attribute with the specified name.<br>  A Predicate is of the form [ PredicateExpr ]<br>  PredicateExpr is a Expr<br>  Expr is one of:<br>    VariableReference<br>    ( Expr )<br>    Literal<br>    Number<br>    FunctionCall<br>  Multiple predicates are separated by "/"<br>For example:<br>from-children(ElementName[from-attributes(Attribute Name)]) |
| GetCursor(IGrooveCollectionCursor **o__ppCursor); | Returns a copy of the cursor currently used by the collection. |
| GetCursorPosition(double * o__pRelativePosition); | Returns the relative position of the cursor as a number between 0.0 (first row) and 100.0 (last row). |
| GetEngineMappingTable(void **o__ppEngineURLs); | Returns the engine mapping table. |
| GetExpansionMask(long *o__pMask); | Gets the current value of the expansion mask. |
| GetRecordCount(long * o__pRecordCount); | Returns the number of records in the collection. |
| HasOrdinalSort(BSTR * o__pSortName, VARIANT_BOOL *o__pHaveSort); | If the collection has an ordinal index, returns the sort name and the value TRUE, otherwise it returns FALSE. |
| HasSort(BSTR i__ColumnName, GrooveCollationOrder i__CollationOrder, long i__Level, BSTR *o__pSortName, VARIANT_BOOL *o__pHaveSort); | Returns a bool indicating whether or not a sort exists in the collection for the column specified by i__ColumnName on level i__Level in collation order i__AscendingSort. If a sort exists the sort name is returned in o__pSortName. |
| IsEmpty(VARIANT_BOOL *o__pIsEmpty); | Returns a bool indicating whether or not the collection is empty. |
| MarkAll(VARIANT_BOOL i__Read); | Sets the record read/unread indicator for all records in the collection to be the value of Read. |
| MarkRead(double i__RecordID); | Sets a specific record to be marked as read. |
| MarkUnread(double i__RecordID); | Sets a specific record to be marked as unread. |

TABLE 38-continued

Interface IGrooveCollection : IGrooveDispatch

| | |
|---|---|
| MoveCursor(GrooveCollectionCursor Position i__AbsolutePosition, GrooveCollectionNavigationOp i__Navigator, long i__Distance, long *o__pDistanceMoved); | Every collection has a cursor. The cursor establishes the starting position in the source document, which will then be used to build the result document. AbsolutePosition may have the values First, Last, or Current. Navigator may have the following values: Value Description NextAny, PriorAny Move the cursor to the next/previous source row, traversing down through child rows and up through parent rows. NextPeer, PriorPeer Move the cursor to the next/previous source row at the same level, stopping if a row at a higher level is reached. NextParent, PriorParent Move the cursor to the next/previous parent source row, traversing until the root row is reached. NextData, PriorData Move the cursor to the next/previous row that contains a data record. NextUnread, PriorUnread Move the cursor to the next/previous unread row. Distance sets the numbers of iterations to move the cursor, starting at AbsolutePosition and moving through Distance iterations of Navigator movement. MoveCursor returns the number of iterations the cursor was actually moved. |
| MoveCursorToRecord(double i__RecordID); | Sets the collection's cursor to point to the specified record. |
| MoveCursorToValue(BSTR i__pQuery, double * o__pRecordID); | Using the current sort order, positions the cursor to the row that meets the criteria of matching the relop to the input query values. The relop (relational operator) may be EQ, LT, LE, GT, or GE. The query values must match, in order, the datatypes of the columns of the current sort order or must be able to be converted in a loss-less manner to those datatypes. Fewer query values may be specified than are defined in the sort order, which will result in a partial match. For collections ordered on an interval, the first query value is the interval's starting value and the second is the ending value. |
| MoveToCursor(IGrooveCollection Cursor *i__pCursor); | Moves the collection to the position specified by i__pCursor. |
| Open(BSTR i__CollectionURL, IGrooveElement *i__pCollectionDescriptorElement, VARIANT_BOOL i__Temp, VARIANT_BOOL i__Shared, VARIANT_BOOL * o__pCreated); | Creates or opens the collection specified by I_CollectionURL within the Groove storage service i__ServiceType. Returns a bool indicating whether or not the collection was created for the first time. |
| OpenRecord(double i__RecordID, IGrooveRecord ** o__ppRecord); | Returns an interface pointer to a specific record in the collection. |
| OpenRecordID(double i__SourceRecordID, enum GrooveCollectionNavigationOp i__Relation, double * o__pTargetRecordID); | Starting from the position of the SourceRecordID, perform the specified collection navigation operation and return the resulting record ID. |
| OpenResultArray(long i__NumReturnRows, void *io__pResultArray); | Given the collection's expansion mask, current cursor position and current sort order, return at most NumReturnRows into a result array conforming to the description below. Note that NumReturnRows is a quota only on the data rows - other synthesized header and footer rows may be returned as necessary. Column Name Data Type Description |

TABLE 38-continued

| Interface IGrooveCollection : IGrooveDispatch | |
|---|---|
| | RowType<br>UINT1<br>==WAFFLE_ROW_DATA if the row is a data record returned from an engine,<br>==WAFFLE_ROW_HEADER false if the row is a synthesized header (e.g., category),<br>==WAFFLE_ROW_FOOTER if the row is a synthesized footer (e.g., aggregate result).<br>SynthKind<br>UINT1<br>If the row is a data row, this value is 0. If the row is a synthesized row, this value will be one of:<br>BreakUnique: Indicates a change in value of categorized or sorted column. One of the ColumnName(i) columns will have the new value.<br>BreakUnitDay<br>BreakUnitWeek<br>BreakUnitMonth<br>BreakUnitYear<br>FuncTotal<br>FuncCount<br>EngineID<br>UINT4<br>If the row is a data row: Index into the EngineID table, which is a vector of URLs stored as BSTRs. If the row is a synthesized row, EngineID is 0.<br>RecordID<br>UINT4<br>If the row is a data row: RecordID returned from the engine identified by EngineID. RecordIDs are unique within EngineIDs.<br>If the row is a synthesized row: RecordID is a unique number within the collection.<br>Level<br>UINT1<br>Number of levels to indent this row. Level 0 is the top or outermost level.<br>RelativePosition<br>UINT2<br>A number between 0 and 10000 indicating the relative offset of this row from the beginning of the collection. [It may be an approximation.] For example, 6823 is the value for a row that is 68.23% of the way through the collection.<br>Read<br>BOOL<br>If the row is a data row: True if the [account??] has read the record. If the row is a synthesized row, Read is always true (even if it is collapsed).<br>ColumnName(i)<br>Defined by the collection descriptor.<br>Data value for this row/column. There will be as many columns in the array as there were defined columns at all levels. |
| OpenSchema(long i_Level,<br>VARIANT_BOOL<br>i_IncludeSystemColumns,<br>IGrooveRecordSchema<br>**o_ppCollectionSchema); | Return an interface pointer to the schema description for the records in the collection. |
| OpenTransaction(IGrooveTransaction<br>**o_ppTransaction); | Creates a transaction on the collection document. |
| OpenWaffle(IGrooveWaffleListener<br>*i_pListener, IGrooveWaffle<br>**o_ppWaffle); | Creates an IGrooveWaffle instance and adds it to the collections list of event listeners. |
| SetCursorPosition(double<br>i_RelativePosition); | Sets the current position of the cursor to the row with the specified relative position. The position should be a number between 0.0 (first row) and 100.0 (last row). |
| SetExpansionMask(long i_Mask); | Sets the current value of the expansion mask. The mask is a stored in a DWORD, but only the first 10 (or so) bits are used. If a bit is set, all data the indicated level is expanded. The expansion mask is not persistent or shared —its effect is only on this collection object. The default value of the expansion mask is all 1s. |

TABLE 38-continued

| Interface IGrooveCollection : IGrooveDispatch | |
|---|---|
| SetRecordExpansion(double i_RecordID, VARIANT_BOOL i_Expand); | Sets the expansion state for a single row for this scope. If Expand is true, the record will be expanded, otherwise it will be collapsed. If EngineID is 0, then all rows encompassed by specified synthesized RecordID will be either expanded or collapsed. |
| Update(BSTR i_EngineURL, GrooveCollectionUpdateOp i_Operation, void * i_pUpdateRecord, IGrooveElement * io_pUpdateContext); | Updates the collection. i_Operation is one of: OP_ADD, OP_DELETE, or OP_UPDATE. |
| UseSort(BSTR i_SortName, VARIANT_BOOL i_RetainCursorPosition); | Sets the sort order for the collection to the named sort order. The specified SortName must be one of the defined sort orders in the collection descriptor. If i_RetainCursorPosition is true and the current cursor position identifies a data record, the current collection's cursor is positioned to the same record in the new sort order. Otherwise, the cursor position is positioned to the first row in the new sort order. |

Table 39 illustrates an interface 1504 (IGrooveCollectionListener) for a client of a collection manager that wishes to be notified whenever "significant" events happen within the collection. Significant events may occur at any time and include updating, addition, deletion, reparenting, or a change in ordinal position of a collection element. The collection manager listener interface includes the following methods:

TABLE 39

| interface IGrooveCollectionListener : IGrooveDispatch | |
|---|---|
| OnRecordChange(IGrooveElement *i_pElement); | Called when the data in this element has been updated or the element has been added, deleted, reparented, or its ordinal position has changed. |
| OnSortChange(void); | Called when the sort order for the collection changes. |

Table 40 illustrates an interface 1506 (IGrooveCollectionCursor) for a client of a collection manager that wants to move a cursor within the collection. A collection may have one or more cursors active at any time. The collection manager cursor interface includes the following methods:

TABLE 40

| interface IGrooveCollectionCursor : IGrooveDispatch | |
|---|---|
| Move (GrooveCollectionCursorPosition i_AbsolutePosition, GrooveCollectionNavigationOp i_Navigator, long i_Distance, long *o_pDistanceMoved); | Moves the cursor in either an absolute or relative amount. AbsolutePosition may have the values First, Last, or Current. Navigator may have the following values: Value Description NextAny, PriorAny Move the cursor to the next/previous source row, traversing down through child rows and up through parent rows. NextPeer, PriorPeer Move the cursor to the next/previous source row at the same level, stopping if a row at a higher level is reached. NextParent, PriorParent Move the cursor to the next/previous parent source row, traversing until the root row is reached. NextData, PriorData Move the cursor to the next/previous row that contains a data record. NextUnread, PriorUnread Move the cursor to the next/previous unread row. Distance sets the numbers of iterations to move the cursor, starting at AbsolutePosition and moving through Distance iterations of Navigator movement. Move returns the number of iterations the cursor was actually moved. |
| OpenRecord (IGrooveRecord ** o_ppRecord); | Returns an interface pointer to the record the cursor is currently set at. |

The following tables illustrate allowed values for the enumerated data types listed in the above interfaces. In particular, Table 41, illustrates allowed values for the GrooveCollationOrder enumerated data type:

TABLE 41

| GrooveCollationOrder | |
|---|---|
| CollateAscending | Ordered by ascending data values. |
| CollateDescending | Ordered by descending data values. |
| CollateOrdinal | Ordered by ordinal position. |

Table 42 illustrates the allowed values for the GrooveCollectionNavigationOp enumerated data type:

TABLE 42

| GrooveCollectionNavigationOp | |
| --- | --- |
| NextAny | Move the cursor to the next source row, traversing down through child rows and up through parent rows. |
| PriorAny | Move the cursor to the previous source row, traversing down through child rows and up through parent rows. |
| NextPeer | Move the cursor to the next source row at the same level, stopping if a row at a higher level is reached. |
| PriorPeer | Move the cursor to the previous source row at the same level, stopping if a row at a higher level is reached. |
| NextParent | Move the cursor to the next parent source row, traversing until the root row is reached. |
| PriorParent | Move the cursor to the previous parent source row, traversing until the root row is reached. |
| NextData | Move the cursor to the next row that contains a data record. |
| PriorData | Move the cursor to the previous row that contains a data record. |
| NextUnread | Move the cursor to the next unread row. |
| PriorUnread | Move the cursor to the next unread row. |

Table 43 illustrates the allowed values for the GrooveCollectionCursorPosition enumerated data type:

TABLE 43

| GrooveCollectionCursorPosition | |
| --- | --- |
| First | The first row in the collection. |
| Last | The last row in the collection. |
| Current | The current row in the collection. This position is useful for performing relative cursor movement. |

Table 44 illustrates the allowed values for the GrooveCollectionRowType enumerated data type:

TABLE 44

| GrooveCollectionRowType | |
| --- | --- |
| ROW_DATA | A row with data values. |
| ROW_HEADER | A row header, for example, column break values. |
| ROW_FOOTER | A row footer, for example, column break values and an aggregated result. |

Table 45 illustrates the allowed values for the GrooveCollectionSynthType enumerated data type:

TABLE 45

| GrooveCollectionSynthType | |
| --- | --- |
| BreakUnique | Synthesized collection row indicates a change in value of categorized or sorted column. One of the other columns will have the new value. |
| BreakUnitDay | Synthesized collection row is a break on the change in units of days. |
| BreakUnitWeek | Synthesized collection row is a break on the change in units of weeks. |
| BreakUnitMonth | Synthesized collection row is a break on the change in units of months. |
| BreakUnitYear | Synthesized collection row is a break on the change in units of years. |
| FuncTotal | Synthesized collection row is the result of an aggregate total function. |
| FuncCount | Synthesized collection row is the result of an aggregate count function. |

Table 46 illustrates the allowed values for the GrooveCollectionUpdateOp enumerated data type:

TABLE 46

| GrooveCollectionUpdateOp | |
| --- | --- |
| OP_ADD | Add the record to the collection. |
| OP_DELETE | Delete the record from the collection. |
| OP_UPDATE | Change values of specific fields in this record, which is already in the collection. |
| OP_REPARENT | Change this record's parent. |
| OP_CHANGE_ORDINAL | Change the ordinal position of this record in the collection. |

Table 47 illustrates the allowed values for the GrooveCollectionWaffleSystem enumerated data type:

TABLE 47

| GrooveCollectionWaffleSystemColumns | |
| --- | --- |
| WAFFLE_ROWTYPE_COLUMN | One of the values for GrooveCollectionRowType. |
| WAFFLE_SYNTHKIND_COLUMN | If not a data row, one of the values in GrooveCollectionSynthType. |
| WAFFLE_RECORDID_COLUMN | A unique identifier for the record. The RecordID must be unique within the collection, but may not be unique in other scopes. |
| WAFFLE_PARENT_RECORDID_COLUMN | A reference to a parent record that contains the recordID of a record in the collection. If the record reference in the parent recordid is deleted, this record will also be deleted from the collection. |
| WAFFLE_LEVEL_COLUMN | The number of indention levels from the root level of the hierarchy. The root level is 0. |
| WAFFLE_RELPOS_COLUMN | A number between 0.0 (first row) and 100.0 (last row). |
| WAFFLE_READ_COLUMN | A list of whoever has read this record. If this field is not present, no users have read the record. |

TABLE 47-continued

| GrooveCollectionWaffleSystemColumns | |
| --- | --- |
| WAFFLE_EXPANDED_COLUMN | A boolean indicator for whether the row is collapsed or fully expanded. |
| WAFFLE_HASCHILDREN_COLUMN | A boolean indicator for whether the row has children. |

Table 48 illustrates the allowed values for the GrooveCollectionRecordID enumerated data type:

TABLE 48

| GrooveCollectionRecordID | |
| --- | --- |
| NULL_RECORD_ID | The reserved value for the special null record id. |

Table 49 illustrates the allowed values for the GrooveSortOrder enumerated data type:

TABLE 49

| GrooveSortOrder | |
| --- | --- |
| Ascending | Collate by ascending data values |
| Descending | Collate by descending data values. |

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium can be either a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system and operating system, other hardware and operating system software could be used in the same manner as that described. Other aspects, such as the specific instructions utilized to achieve a particular function, as well as other modifications to the inventive concept are intended to be covered by the appended claims.

What is claimed is:

1. Apparatus for representing and managing an XML compliant document in a memory in a computer environment comprising a plurality of concurrently executing processes, the XML-compliant document being composed of a plurality of elements arranged in a nested relationship, the apparatus comprising: computer storage medium having:

a plurality of element objects, each element object representing a respective element of the plurality of elements of the XML-compliant document, each element object providing a programming interface to information associated with the respective element of the plurality of elements;

a mapping between elements of the plurality of elements and computer executable instructions that implement a respective element object of the plurality of element objects;

computer-executable instructions that, when executed, provide a mechanism for arranging the plurality of element objects in a hierarchy representative of the nested relationship of the elements; and computer-executable instructions that, when executed, provide an application programming interface for applications to manipulate information associated with the plurality of elements, the application programming interface, in response to a call from an application program to manipulate an element of the plurality of elements, identifying from the mapping a respective element object for the element and returning to the application through the application programming interface a pointer to the respective element object, whereby the application can manipulate the element by invoking the computer executable instructions implementing the respective element object through the programming interface of the respective element object; and a schema document referenced by the XML-compliant document, the schema document containing element objects and the mapping, wherein:

the mapping is contained within the schema document;

the schema data is accessed using the computer-executable instructions that provide an application programming interface for applications to manipulate information associated with the plurality of elements of the XML-compliant document; and the XML-compliant document is accessed from applications executing in each of the plurality of concurrently executing processes.

2. The apparatus as recited in claim 1 wherein at least some of the elements contain textual content and wherein element objects representing the elements provide the textual content through the programming interface associated with the element object.

3. The apparatus as recited in claim 1 wherein at least some of the elements contain attributes having values and wherein element objects representing the elements provide the attribute values through the programming interface associated with the element object.

4. The apparatus as recited in claim 3 wherein the attribute values contained in the at least some elements are typed.

5. The apparatus as recited in claim 3 further comprising an attribute index containing consistent pointers to all element objects containing attribute values.

6. The apparatus as recited in claim 1 wherein the arranging mechanism comprises database pointers and wherein a database pointer in a parent element object points to.

7. The apparatus as recited in claim 1 wherein the schema document is referenced by an XML processing statement in the data document.

8. The apparatus as recited in claim 1 further comprising a binary document object for representing a data document containing binary data.

9. The apparatus as recited in claim 1 further comprising a document object for representing the XML-compliant document.

10. The apparatus as recited in claim 9 wherein the document object contains links to other document objects so that the other document objects are sub-documents of the document object.

11. The apparatus as recited in claim 1 wherein each of the element objects exports a uniform interface containing methods for manipulating each of the element objects.

12. A method for representing and managing an XML-compliant document in a computer memory, the XML-compliant document comprising: information accessed from each of a plurality of concurrently executing processes, the XML-compliant document being composed of a plurality of elements arranged in a nested relationship, the method comprising:
   (a) creating a representation of a data document in the computer memory, the representation including;
   a plurality of element objects, each element object representing a corresponding part of the XML-compliant document and providing a programming interface, at least a portion of the plurality of element objects being stored as objects within a distributed shared memory system, and
   a mapping between each of a plurality of parts of the XML-compliant document and computer executable instructions that implement a corresponding element object of the plurality of element objects;
   (b) arranging the plurality of element objects in a hierarchy representative of the nested relationship of the elements;
   (c) accessing an element of the data document from a first of the concurrently executing processes through a first storage manager interface, the first storage manger interface accessing the mapping to generate a pointer to a corresponding element object representing the element, and the accessing further comprising using the pointer to access the programming interface of the corresponding element object of the plurality of element objects representing the element, whereby computer-executable instructions associated with the corresponding element object being-accessed manipulate data associated with the element through the distributed shared memory system;
   (d) accessing the element of the data document from a second of the concurrently executing processes through a second storage manager interface, the second storage manager interface accessing the mapping to generate a pointer to a corresponding element object representing the element, and the accessing further comprising using the pointer to access the programming interface of the corresponding element object of the plurality of element objects representing the element, whereby computer-executable instructions associated with the corresponding element object being accessed manipulate data associated with the element through the distributed shared memory system;
   (e) creating a schema document referenced by the data document in the computer memory, the schema document containing element objects and the mapping; and
   (f) accessing element objects of the schema document using the interfaces used to access the data document, wherein the XML-compliant document is the data document and the mapping is contained within the schema document, the schema document containing schema data represented by element objects, whereby the schema data is accessed using interfaces used to access the XML-compliant document.

13. The method as recited in claim 12 wherein at least some of the elements contain textual content and wherein element objects representing the elements contain the textual content.

14. The method as recited in claim 12 wherein at least some of the elements contain attributes having values and wherein element objects representing the elements contain the attribute values.

15. The method as recited in claim 14 wherein the attribute values contained in the at least some elements are typed.

16. The method as recited in claim 14 further comprising an attribute index containing consistent pointers to all element objects containing attribute values.

17. The method as recited in claim 12 wherein step (b) comprises creating a database pointer in a parent element object which pointer points to child objects of the parent element object in order to arrange the parent object and child objects in a hierarchical relationship.

18. The method as recited in claim 12 wherein step (e) comprises creating the schema document referenced by an XML processing statement in the data document.

19. The method as recited in claim 12 further comprising (e) creating a binary document object in the memory for representing a data document containing binary data.

20. The method as recited in claim 12 further comprising (e) creating a document object in the memory for representing the data document.

21. The method as recited in claim 20 wherein the document object contains links to other document objects so that the other document objects are sub-documents of the document object.

22. The method as recited in claim 12 wherein each of the element objects exports a uniform interface containing methods for manipulating each of the element objects.

23. A computer program product for representing and managing a first XML-compliant document in a memory in a computer environment comprising a plurality of concurrently executing processes, the first XML-compliant document being composed of a plurality of elements arranged in a nested relationship, the computer program product comprising a computer storage medium having computer readable program code thereon, including:
   program code creating a second XML-compliant document in the memory including a plurality of element objects, each element object representing a part of the first XML-compliant document, each of the element objects providing a programming interface to information associated with an element of the plurality of elements, the second XML-compliant document further comprising a registry mapping elements of the plurality of elements to element objects of the plurality of element objects; and program code arranging the plurality of element objects in a hierarchy representative of the nested relationship of the elements; and program code for accessing the registry based on an XML-compliant statement in the first XML-compliant document to select element objects in response to a request to manipulate elements of the first XML-compliant document, wherein:

the second XML-compliant document comprises a schema document comprising schema data represented by element objects;

the schema data is accessed using interfaces used to access the first XML-compliant document; and the plurality of elements arranged in the nested relationship are accessible from each of the plurality of concurrently executing processes.

24. The computer program product of claim 23, further comprising program code for managing a telespace, the program code for managing the telespace accessing the program code for creating the data document to store telespace information in an XML-compliant document.

25. The computer program product of claim 24, further comprising program code for implementing a distributed memory system storing information associated with the XML-compliant document; and wherein at least a portion of the element objects comprises a method, accessible through the programming interface of the element object, for retrieving information about the XML-compliant document from the distributed memory system.

* * * * *